United States Patent [19]

Saito et al.

[11] Patent Number: 4,849,471

[45] Date of Patent: Jul. 18, 1989

[54] IMPACT-RESISTANT POLYAMIDE COMPOSITION

[75] Inventors: Kazuaki Saito, Chigasaki; Yoshifumi Nishimura, Kawasaki; Shinichi Izawa, Tokyo, all of Japan

[73] Assignee: Asahi Kasei Kogyo Kabushiki Kaisha, Osaka, Japan

[21] Appl. No.: 909,429

[22] Filed: Sep. 19, 1986

[30] Foreign Application Priority Data

Sep. 21, 1985 [JP] Japan .................................. 60-207788
Sep. 21, 1985 [JP] Japan .................................. 60-207789

[51] Int. Cl.$^4$ ............................................. C08L 77/00
[52] U.S. Cl. ...................................... 525/66; 525/89; 525/92; 525/940
[58] Field of Search ...................... 525/66, 89, 92, 940

[56] References Cited

U.S. PATENT DOCUMENTS

| | | | |
|---|---|---|---|
| 3,595,942 | 7/1971 | Wald et al. ........................... | 525/339 |
| 4,386,176 | 5/1983 | Fukuda et al. ........................ | 525/92 |
| 4,427,828 | 1/1984 | Hergenrother et al. ............... | 525/92 |
| 4,429,076 | 1/1984 | Saito et al. ............................ | 525/66 |
| 4,578,429 | 3/1986 | Gergen et al. ........................ | 525/291 |

*Primary Examiner*—Melvyn I. Marquis
*Assistant Examiner*—A. Carrillo
*Attorney, Agent, or Firm*—Birch, Stewart, Kolasch & Birch

[57] ABSTRACT

A moldable composition, which comprises polyamide incorporated with at least one polymer selected from the group consisting of hydrogenated block copolymer and ethylene-containing polymer, and with a specified modified block copolymer each in a specified ratio and amount, having excellent impact resistance and good balance of properties among stiffness, heat resistance and weld zone strength, as well as good moldability and excellent appearance of molded articles which have utility in a wide field of application including automobile parts, electric appliance parts and electronic parts.

10 Claims, 12 Drawing Sheets

X40000

IMPACT-RESISTANT POLYAMIDE COMPOSITION

FIELD OF THE INVENTION AND RELATED ART STATEMENT

1. FIELD OF THE INVENTION

This invention relates to a polyamide composition which shows an extremely excellent impact resistance, good balance among such physical properties as stiffness, heat resistance and weld zone strength, and improved moldability and appearance of molded articles. More particularly, it relates to a polyamide composition which shows an excellent impact resistance, good balance among such physical properties as flexural modulus, heat resistance and weld zone strength, and improved moldability and appearance of molded articles which composition comprise (a) polyamide, (b) at least one polymer selected from the group consisting of (i) a block copolymer comprising a vinyl aromatic polymer block A and an olefin polymer block B, the degree of unsaturation of said block B not exceeding 20% (said block copolymer being hereinafter to as hydrogenated block copolymer); and (ii) an ethylene-containing polymer, and (c) a modified block copolymer formed by addition of a carboxylic acid or its derivative group to said hydrogenated block copolymeer (hereinafter referred to simply as modified block copolymer).

2. RELATED ART STATEMENT

Polyamide is a useful engineering plastic characterized by its excellent mechanical strength, dyeing property, chemical resistance, abrasion resistance, etc. Further, a number of technologies are known which improve the impact strength of polyamide to widen its field of application. Among such prior art technologies, it has been known to improve the impact strength of polyamide by adding modified block copolymer thereto. Japanese Patent Application Kokai (Laid-Open) No. 7,443/83 discloses a thermoplastic polymer composition comprising a polar thermoplastic polymer having polar functional groups and a modified block copolymer, and describes polyamide as an example of the polar thermoplastic polymer. However, although the composition disclosed in said Japanese Patent Application Kokai (Laid-Open) No. 7,443/83 gives molded articles of an excellent impact resistance, it shows low heat resistance, low weld zone strength and poor moldability, and hence inevitably molded articles made from this composition are of poor gloss and appearance.

Japanese Patent Application Kokai (Laid-Open) No. 56,451/84 discloses an impact-resistant polymer composition which comprises (a) polymide having a number average molecular weight of at least 10,000 and (b) a maleic anhydride adduct of a hydrogenated polymer of one or more conjugated dienes or a hydrogenated copolymer of a conjugated diene and a vinyl aromatic hydrocarbon, at least 5% by weight of said components (a) and (b) being present in the form of a graft copolymer. It describes, as one example, the use of maleic anhydried adduct of block copolymer in its Example 6. However, this composition shows low heat resistance and weld zone strength and also poor moldability, and hence molded articles of good appearance cannot be made from this composition.

A technology is also known in which block copolymer is added to polyamide. U.S. Pat. No. 4,041,103 discloses a composition which comprises (a) 100 parts by weight of partially hydrogenated block copolymer and (b) 5 to 200 parts by weight of polyamide. However, it gives only a product of extremely low flexural modulus or of low impact strength, and molded articles of good appearance cannot be made from this composition.

On the other hand, U.S. Pat. No. 4,174,358 discloses a toughened multiphase thermoplastic composition which consists essentially of one phase containing 60 to 99% by weight of a polyamide matrix resin having a number average molecular weight of at least 5,000, and of 1 to 40% of at least one other phase containing particles of at least one polymer having a particle size in the range between 0.01 and 1.0 μm and having sites capable of adhering to said polyamide matrix resin. A very wide range of polymers are described therein as being usable as said at least one polymer contained in said at least one other phase.

However, said U.S. Pat. No. 4,174,358 neither suggests nor discloses the modified block copolymer used in the present invention. Further, the composition disclosed in Examples of said patent hardly shows a good balance among properties including impact resistance, stiffness, heat resistance, and weld zone strength, good moldability, and good appearance of molded articles, which are intended in the present invention.

OBJECT AND SUMMARY OF THE INVENTION

The object of this invention is to provide a polyamide composition which shows excellent impact resistance and at the same time good balance of properties among stiffness, heat resistance and weld zone strength and further shows good moldability and good appearance of molded articles.

Thus, the present inventions have made an extensive study to obtain, while using the modified block copolymer disclosed in Japanes Patent Application Kokai (Laid-Open) No. 7,443/83 as a means for improving the impact resistance of polyamide, composition which shows physical properties including stiffness, heat resistance and weld zone strength well balanced within a practically useful range, shows good moldability and gives molded articles of excellent appearance and gloss. As a result, it has been found that incorporation of a specified proportion of at least one polymer selected from the group consisting of unmodified hydrogenated block copolymer and ethylene-containing polymer as the third component to a specified, modified block copolymer yields drastically improved heat resistance and weld zone strength, excellent moldability and markedly improved appearance and gloss of molded articles while maintaining the impact resistance-improving effect of the modified block copolymer, even when the particle size of these components are not adjusted to a specified range. The present invention has been accomplished on the basis of above finding.

Thus, the present invention provides a polyamide composition which shows excellent impact resistance and at the same time good balance of properties among stiffness, heat resistance and weld zone strength, and further shows good moldability and good appearance of molded articles, which composition comprises (a) 60 to 90% by weight, preferably 65 to 85% by weight, of polyamide, (b) 2 to 36% by weight, preferably 3 to 30% by weight, of at least one polymer selected from the group consisting of (i) a block copolymer comprising a vinyl aromatic compound polymer block A and an olefin compound polymer block B, the degree of unsaturation of said block B not exceeding 20%; and (ii) an ethylene-containing polymer, and (c) 2 to 36% by weight, preferably 3 to 30% by weight, of a modified block copolymer formed by bonding a molecular unit containing a carboxylic acid group of its derivative group to said block copolymer, the amount of said molecular unit containing a carboxylic acid group or its derivative group bonded to the modified block copolymer of (c) (hereinafter referred to as the modification amount of modified block copolymer), expressed in terms of x parts by weight per 100 parts by weight of the block copolymer before modification, and the compounding ratio of said modified block copolymer to the sum of the weigh of the modified block copolymer (wt. of MBC) of (c) and the weight of at least one polymer (wt. of HBC/ECP) of (b) selected from the group consisting of hydrogenated block copolymer and ethylene-containing polymer (hereinafter referred to as compounding ratio of modified block copolymer), expressed in terms of y:

$$y = \frac{(\text{Wt. of } MBC)}{(\text{Wt. of } MBC) + (\text{Wt. of } HBC/ECP)},$$

being present within the range specified by the following expressions:

$0.1 \leq x \leq 2,$ $0.1 \leq y \leq 0.9,$ and $y \geq -x + 0.5.$

The resin composition of the present invention is an excellent molding material which, in addition to the above-mentioned characteristic properties, retains excellent chemical resistance and abrasion resistance characteristic of polyamide.

The compsoition of the present invention, which comprises polyamide incorporated with at least one polymer selected from the group consisting of hydrogenated block copolymer and ethylene-containing polymer and with a specified modified block copolymer each in a specified ratio and amount, shows excellent impact resistance and at the same time good balance of properties among stiffness, heat resistance and weld zone strength, further shows good moldability and excellent appearance of molded articles, and retains excellent chemical resistance and abrasion resistance characteristic of polyamide. Accordingly, it can be used in a wide field of applications including automobile parts, electric appliance parts, and electronic parts.

DESCRIPTION OF THE PREFERRED EMBODIMENTS

Figure 1:
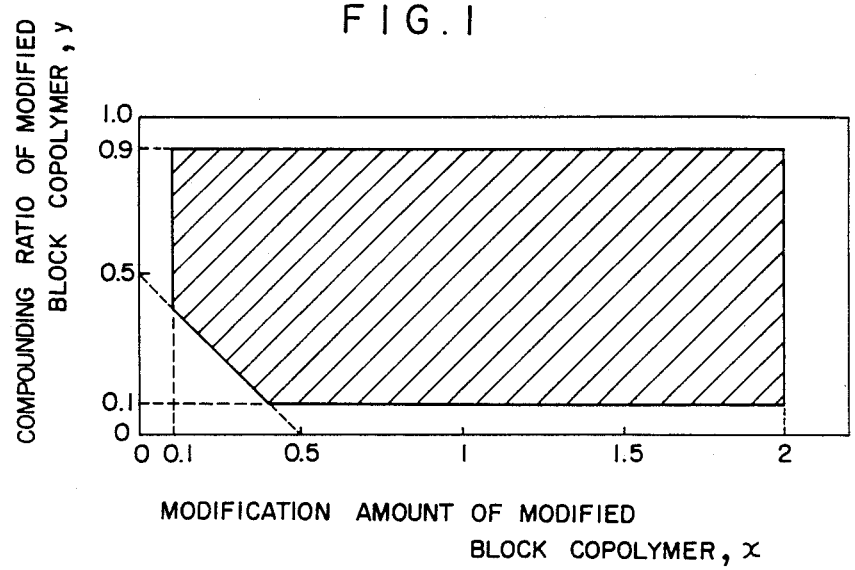
FIG. 1 is a graph showing the relationship between the modification amount of modified block copolymer, x, and the compounding ratio thereof, y, and shows that the hatched portion indicates the claimed range of the present invention, which is given by said three expressions.

The polyamide used in the present invention include aliphatic polyamides such as nylon 46, nylon 6, nylon 66, nylon 610, nylon 11 and nylon 12, aromatic polyamide containing ar aromatic component such as terephthalic acid and isophthalic acid, for example hexamethylene terephthalamide, tetramethylene isophthalamide and hexamethylene isophtalamide, and copolyamide and mixed polyamide which consist principally of these components.

As preferred examples, there may be mentioned nylon 6 and nylon 66.

The hydrogenated block copolymer comprising a vinyl aromatic polymer block A and an olefin polymer block B used in the present invention are obtained by selective hydrogenation of the conjugated diene portion of a block copolymer comprising a vinyl aromatic polymer block and a conjugated diene polymer block.

The above-mentioned block copolymer comprising a vinyl aromatic polymer block and a conjugated diene polymer block is a block copolymer comprising vinyl aromatic polymer blocks (X) and (X') and a conjugated diene polymer block (Y) (X and X' may be the same or different). It includes linear block copolymers represented by the formulas $(X-Y)_n$, $X-Y-X'$, $X-Y-X-Y_nX$, and $X-Y-X_nY$ (wherein n is an integer of 1 to 10 ) and radial block copolymers represented by the formulas $[(Y-X)_n]_{m+2}Z$, $[(X-Y)_n]_{m+2}Z$, $[(Y-X)_n-Y]_{m+2}Z$, $[(X-Y)_n-X]_{m+2}Z$, (wherein m is an integer of 1 to 4, and Z is the residue of a coupling agent such as silicon tetrachloride and tin tetrachloride or the residue of an initiator such as polyfunctional organic lithium compounds).

Typical examples of vinyl aromatic compounds which can be used here include styrene, α-methylstyrene, vinylxylene, ethylvinylxylene, vinylnaphthalene and the mixtures thereof. Examples of conjugated diene compounds include butadiene, isoprene, 1,3-pentadiene, 2,3-dimethylbutadiene, and the mixtures thereof.

The terminal blocks of these block copolymers may be either the same of different.

The number average molecular weight of these block copolymers is 10,000 to 800,000, preferably 20,000 to 500,000. The content of vinyl aromatic compounds in the block copolymer is preferably 10 to 70% by weight, more preferably 10 to 55% by weight.

The hydrogenated block copolymer to be used in this invention is obtained by selective hydrogenation of the conjugated diene portion of above-mentioned block copolymer. For example, a hydrogenated block copolymer wherein not more than 20% of the aromatic double bonds of said vinyl aromatic block thereof and at least 80% of the aliphatic double bonds of said conjugated diene polymer block thereof are hydrogenated can be prepared by hydrogenagating the above-mentioned block copolymer according to the method described in Japanese Patent Application Kokoku (Post-Exam. Publn.) No. 8704/67.

The degree of unsaturation of "block b" referred to in the present invention means the proportion of carbon-carbon double bonds contained in said block B, and is usually in the range not exceeding 20%. It can be determined by means of instrumental analysis such as nuclear magnetic resonauce spectrometry (NMR) and infrared absorption spectrometry (IR), and chemical analysis such as iodometric titration.

These hydrogenated block copolymers may be used not only singly but also as a mixture of two or more thereof.

The ethylene-containing polymer used in the present invention includes a copolymer of ethylene with an α-olefin other than ethylene and has a degree of crystallinity in the range of usually not more than 40%, preferably not more than 30%. As mentioned above, the ethylene-containing polymer of the present invention includes ethylene polymer, copolymer of ethylene with a copolymerizable monomer other than ethylene, or a mixture thereof, and has a glass transition temperature in the range of usually not higher than $-10°$ C., preferably not higher than $-20°$ C. As examples of the copolymerizable monomer unit other than ethylene of said ethylene-containing copolymer, there may be mentioned α-olefins such as propylene, 1-butene, 1pentene, 4-methyl-1-pentene, 1-hexene, 1-octene, 1-decene, and 1-dodecene; vinyl esters such as vinyl acetate and vinyl prooopionate; arcylic esters such as methyl acrylate, ethyl acrylate, propyl acrylate, and butyl acrylate; methacrylic esters such as methyl methacrylate, ethyl methacrylate, propyl methacrylate, and butyl methacrylate; unconjugated dienes such as 1,4-hexadiene, 1,5hexadiene, dicyclopentadiene, 5-ethylidene-2-norbornene, and 5-vinyl-2-norbornene; and conjugated dienes such as butadiene, isoprene, and piperylene; and mixtures of two or more thereof.

The ethylene-containing polymer has a melt flow index in the range of preferably 0.01 to 100 g/10 min, more preferably 0.1 to 50 g/10 min.

A preferred example of the ethylene-containing polymer is ethylene-α-olefin copolymer. It has a degree of crystallinity of usually not more than 40%, preferably not more than 30%.

The ethylene-α-olefin copolymer favorably used in this invention are obtained by copolymerizing ethylene and-α-olefin by use of, for example, Ziegler-Natta catalyst, particularly a vanadium compound such as vanadium oxytrichloride and vanadium tetrachloride together with an organic aluminum compound.

As particularly preferable ethylene-α-olefin copolymer, mention may be made of a series of polymers marketed under the trade mark Toughmer ® my Mitsui Petrochemical Industries, Ltd., for exampl Toughmer ® A series (ethylene-butene-1 copolymer) including Toughmer ® A 4085, Toughmer ® A 4090, and Toughmer ® A 20090; and Toughmer ® P series (ethylene-propylene copolymer) including Toughmer ® P 0150, Toughmer ® P 0280, Toughmer ® P 0480, Toughmer ® P 0680, and Toughmer ® P 0880.

The modified block copolymer to be used in the present invention may be obtained by addition of an unsaturated carboxylic acid or a derivative thereof to said hydrogenated block copolymer. Examples of the unsaturated carboxylic acid or the derivative thereof to be added to hydrogenated block block copolymer include maleic acid, maleic anhydride, fumaric acid, itaconic acid, acrylic acid, crotonic acid, cis-4-cyclohexene-1,2-dicarboxylic acid and its anhydride, endo-cis-bicyclo[2,2,1]-5-heptene-2,3-dicarboxylic acid and its anhydride, and maleimide. Maleic anhydride is particularly preferable of these.

The above-mentioned modified block copolymer may be obtained, for example, by addition of an unsaturated carboxylic acid or a derivative thereof to hydrogenated block copolymer, in a solution state or a molten state with or without the use of a radical initiator. Although the method of preparation of these modified block copolymers is not specifically restricted in this invention, those methods are not preferable which will give modified block copolymers that contain undersiable components such as gels or that show an extremely increased melt viscosity and hence a poor processability. A preferred method comprises allowing the hydrogenated block copolymer to react with an unsaturated carboxylic acid or a derivative thereof in an extruder in the presence of a radical initiator.

The modification amount of modified block copolymer must be 0.1 to 2 parts by weight, preferably 0.15 to 1.8 parts by weight, per 100 parts by weight of the hydrogenated block copolymer before modification.

When the modification amount is less than 0.1 part by weight, the resulting copolymer is unsatisfactory in the effect expected for modified block copolymer, and cannot give a composition of satisfactory impact resistance. When the modification amount exceeds 2 parts by weight, the heat resistance of the resulting composition is decreased and the moldability and the appearance of molded articles are deteriorated. The unsaturated carboxylic acid or its derivative may be used not only singly but also as a mixture of two or more thereof.

The amount of at least one polymer selected from the group consisting of hydrogenated block polymer and ethylene-containing polymer, and that of the modified block copolymer must be in the range of 2 to 36 percent by weight. When the amount of said at least one polymer is less than 2 percent by weight, the weld zone strength is decreased and the moldability and apperance of molded articles are also deteriorated and when the amount of the modified copolymer is less than 2 percent by weight, the impact strength is unsatisfactory: whereas when any of both components exceeds 36 percent by weight, the flexural modulus and heat resistance are decreased.

The compounding ratio y of modified block copolymer must be in the range of 0.1 to 0.9. When the compounding ratio is less than 0.1, the impact resistance is decreased; whereas when it exceeds 0.9 the heat resistance and weld zone strength are decreased and moldability and the appearance of molded articles are deteriorated. More preferable compounding ratio is 0.15 to 0.85.

The modification amount of modified block copolymer, x, and the compounding ratio, y, must be within a range satisfying the expression $y \geq -x+0.5$. When x and y are in the range of $y < -x+0.5$, the impact strength is markedly low. Preferable range is indicated by the expression $y \geq -x+0.6$.

Thus, the range of x and y necessary for the present invention is indicated by the hatched region of FIG. 1.

The scope of the present invention includes also a case wherein a graft copolymer comprising modified block copolymer and polyamide, formed by the reaction of reactive groups contained in modified block copolymer with polyamide, is contained as a part of the composition of the present invention.

The resen composition of the present invention can be prepared by use of conventional apparatuses employed for blending high molecular substances. Preferable blending apparatuses are those in which blending can be effected so as to attain a particle size of the dispersed phase of 3 μm or less and include, for example, a extruder, Banbury mixer, and kneader.

Melt-blending can be conducted either by melt-blending all the components simultaneously or by melt-blending two components beforehand. It is sometimes advantageous from the viewpoint of the property of product to melt-blend the components other than polyamide beforehand and then melt-blend the resulting mixture with polyamide.

Other ingredients may be incorporated into the resin composition of the present invention so far as the incorporation is not detrimental to the moldability and properties of the product. These ingredients include, for example, pigments, dyes, reinforcements, fillers, thermal stabilizers, antioxidants, weather-proofing agents, nucleating agents, lubricants, plasticizers, antistatic agents, and other polymers.

The resin composition of the present invention can be processed by conventional methods used for molding thermoplastic resins, for example injection molding, extrusion molding, blow molding and vacuum forming. Particularly useful are various molded articless obtained by injection molding.

The present invention will be explained in more detail below with reference to Examples, but it is not limited thereto.

The test methods used in evaluation in Examples can Comparative Examples are as follows.

(1) Izod impact strength

Izod impact strength was determined according to ASTM D-256 with a notched test piece of ⅛ inch thickness.

(2) Tensile strength and tensile elongation

These were determined according to ASTM D-638 by use of a dumbell test piece of ⅛ inch thickness.

(3) Flexural modulus

This was determined according to ASTM D-790 by use of a test piece of ⅛ inch thickness.

(4) Heat distortion temperature

This was determined according to ASTM D-648 by use of a test piece of ⅛ inch width under a load of 4.6 kg/cm².

(5) Appearance of molded articles

This was evaluated by determination of gloss according to ASTM D 523 at an angle of incidence of 60° and an angle of reflection of 60°.

When the gloss is 50% or less, the molded article has a poor appearance and low marketability.

(6) Weld zone strength

Figure 2:
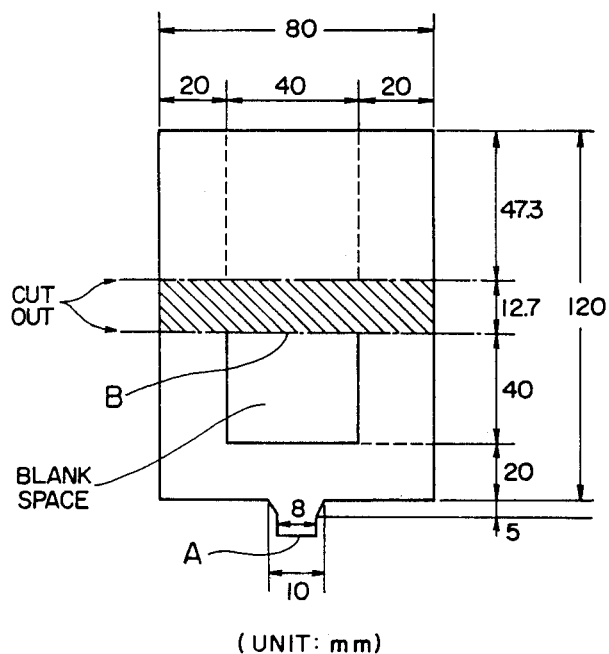
FIG. 2 is a plan view of a molded article.
Figure 3:
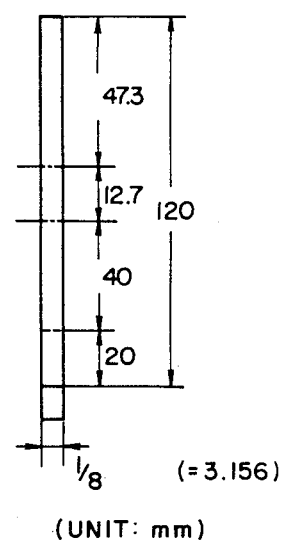
FIG. 3 is a side view of the same. In the Figures, A indicates the position of the gate and B indicates that of the notch.

A molded article as shown in FIGS. 2 and 3 was prepared, and a test piece of ⅛ inch thickness was cut out of the portion shown in the Figures according to ASTM D-256. The test piece was notched along the weld line and tested for its Izod impact strength.

(7) Moldability

Injection test was conducted by use of a injection molding machine and a mold specified below, the cylinder temperature and injection speed being each set at a fixed level and injection pressure alone being varied. Moldability was evaluated from the injection pressure necessary for the resin to fill the mold completely (said pressure being hereinafter referred to as Short Short Point (S.S.P.)).

When Short Short Point is 45 kg/cm²G or more, the composition has a poor moldability and hence give products of low marketability.

The test conditions are as follows:

Injection molding machine: Toshiba-IS-90B

Mold empolyed: a mold capable of giving a molded article shown in FIGS. 2 and 3.

Pellet drying conditions: vacuum drying overnight at 80° C.,

| Cylinder temperature: setting | Nozzle 280° C. | Top 280° C. | Center 270° C. | Rear 260° C. |
|---|---|---|---|---|
| Injection speed setting: | 70 mm/sec | | | |
| Cycle time: | injection time 20 sec, cooling time 20 sec, mold opening time 5 sec. | | | |

Reference Example 1

Preparation of hydrogenated block copolymer

A styrene-butadiene block copolymer of SBS-type having a styrene content of 30%, vinyl content of butadiene portion of 38% and number average molecular weight of 50,000 is obtained by anionic block copolymerization of butadiene and styrene using n-butyllithium as catalystm n-hexane or cyclogexane as solvent and tetrahydrofuran as vinyl content modifier.

The viny content of diene portion is determined by the Hampton method.

The block copolymer obtained above is then hydrogenated in a solvent mixture of n-hexane and cyclohexane by use of cobalt naphthenate and triethylaluminum as catalyst at a hydrogen pressure of 7 kg/cm$^2$ and a temperature of 50° C. for 5 hours. A selectively hydrogenated block copolymer (A) was thus prepared, in which about 90% of the double bonds in the butadiene block portion are hydrogenated and the benzene rings in the styrene block portion remained virtually not hydrogenated. The metals of catalyst residue are removed by washing with aqueous hydrochloric acid-methanol.

In the same manner as above, a variety of hydrogenated block copolymers (B) to (D) shown in Table 1 are prepared.

TABLE 1

| Hydrogenated block copolymer | | | | |
|---|---|---|---|---|
| Abbreviation for hydrogenated block copolymer | (A) | (B) | (C) | (D) |
| Styrene content (%) | 40 | 30 | 30 | 40 |
| Vinyl content of butadiene portion (%) | 41 | 38 | 38 | 35 |
| Number average molecular weight | 65000 | 75000 | 50000 | 50000 |
| Type of block | SBSB | SBS | SBS | SBSB |

Reference Example 2

Preparation of modified block copolymer

One hundred parts by weitht of the hydrogenated block copolymer (A) prepared in Reference Example 1 is uniformly mixed with 1.2 parts by weight of maleic anhydride and 0.3 part by weight of Perhexa 2.5B (mfd. by Nippon Oil & Fats Co., Ltd.). The mixture is supplied to a twin screw extruder (screw diameter: 45 mm, L/D: 33, equipped with a vent) to conduct the maleic anhydride addition at a cylinder temperature of 260° C. while unreacted maleic anhydride being removed by suction through a vent hole. The modified block copolymer (A) thus obtained is dried by heating it under reduced pressure and then analyzed. The addition amount of maleic anhydride is found to be 0.6 phr. The addition amount of maleic anhydride is determined by titration with sodium methylate.

In the same manner as above, a variety of modified block copolymers (B) to (N) shown in Table 2 are prepared.

TABLE 2

| Abbreviation for modified block copolymer | (A) | (B) | (C) | (D) | (E) | (F) | (G) | (H) | (I) | (J) | (K) | (L) | (M) | (N) |
|---|---|---|---|---|---|---|---|---|---|---|---|---|---|---|
| Abbreviation for hydrogenated block copolymer before modification | A | A | A | A | A | A | B | C | C | C | C | C | C | D |
| Preparation conditions | | | | | | | | | | | | | | |
| Modification amount of maleic anhydride added (phr) | 1.2 | 0.6 | 0.7 | 1.0 | 4.0 | 5.0 | 2.0 | 2.5 | 4.0 | 1.0 | 0.6 | 5.0 | 3.0 | 2.5 |
| Kind of peroxide[1] | I | I | I | I | I | I | II | I | I | I | I | I | I | I |
| Amount of peroxide added (phr) | 0.3 | 0.2 | 0.2 | 0.3 | 1.0 | 2.0 | 0.3 | 0.2 | 1.0 | 0.3 | 0.2 | 2.0 | 1.0 | 0.4 |
| Addition amount of maleic anhydride (phr) | 0.6 | 0.15 | 0.2 | 0.4 | 1.8 | 2.2 | 1.1 | 0.8 | 1.8 | 0.4 | 0.15 | 2.2 | 1.4 | 1.2 |

Note
[1]Peroxide I: Perhexa 2.5B (mfd. by Nippon Oil & Fats Co., Ltd.)
Perixode II: Perbutyl D (mfd. by Nippon Oil & Fats Co., Ltd.)

EXAMPLE 1

Ten parts by weight of the hydrogenated block copolymer (A) and 15 parts by weight of the modified block copolymer (A), prepared in Reference Examples 1 and 2 respectively, are dry-blended in a blender, the compounding ratio being 0.6. The mixture is melt-kneaded in a twin screw extruder at 260° C. to obtain an elastomer composition in the form of pellets. Twenty five parts of the elastomer composition obtained above and 75 parts by weight of nylon 66 (number average molecular weight: 18,000) are dry-blended in a blender, and then melt-kneaded in a twin screw extruder at 290° C. to obtain a resin composition in the form of pellets. The resin composition thus obtained was injection-molded to obtain test pieces for determination of physical properties. The composition showed excellent properties of an Izod impact strength of 120 kg·cm/cm, weld zone strength of 52 kg·cm/cm, flexural modulus of 17,900 kg/cm$^2$, tensile strength of 510 kg/cm$^2$, tensile elongation of 75%, and heat distoration temperature of 196° C. The appearance of molded articles are also good, the gloss being 65%, and the moldability is also good.

EXAMPLE 2

A resin composition is obtained and its physical properties are determined in the same manner as in Example 1 except that the amounts of compounded polyamide and modified copolymer, used in Example 1, are altered to 85 and 5 parts by weight, respectively. It showed excellent properties of an Izod impact strength of 58 kg·cm/cm, weld zone strength of 25 kg·cm/cm, flexural modulus of 21,500 kg/cm$^2$, and heat distortion temperature of 212° C. The appearance of molded articles is also good, the gloss being 83%, and the moldability is also excellent.

EXAMPLE 3

A resin composition is prepared and its physical properties are determined in the same manner as in Example 1 except that the amounts of compounded polyamide, hydrogenated block copolymer and modified block copolymer, used in Example 1, are altered to 65, 27 and 8 parts by weight, respectively. It showed good properties of an Izod impact strength of 122 kg·cm/cm, weld zone strength of 61 kg·cm/cm, flexural modulus of 15,400 kg/cm$^2$, and heat distortion temperature of 151°

C. The appearance of molded articles is also good, the gloss being 62%, and the moldability is also excellent.

EXAMPLE 4

Ten parts by weight of the hydrogenated block copolymer (B) and 10 parts by weight of the modified block copolymer (G), prepared in Reference Examples 1 and 2 respectively, and 80 parts by weight of nylon 66 used in Example 1 were uniformly dry-blended in a blender, and the mixture is melt-kneaded in a twin screw extruder at 290° C. to obtain a resin composition in the form of pellets. The resin composition thus obtained is injection-molded to obtain test pieces for determination of physical properties. It showed good properties of an Izod impact strength of 71 kg·cm/cm, weld zone strength of 45 kg·cm/cm, flexural modulus of 20,100 kg/cm$^2$, tensile strength of 530 kg/cm$^2$, tensile elongation of 50%, and heat distortion temperature of 210° C. The appearance of molded articles is also good, the gloss being 78%, and the moldability is also excellent.

EXAMPLE 5

A resin composition is prepared and its physical properties are determined by using the polyamide, hydrogenated block copolymer (B) and modified block copolymer (G), employed in Example 4, in the same manner as in Example 4 except that the amounts of compounded hydrogenated block copolymer and modified block copolymer are altered to 3 and 17 parts by weight, respectively. It showed good properties of an Izod impact strength of 105 kg·cm/cm, weld zone strength of 40 kg·cm/cm, flexural modulus of 19,200 kg/cm$^2$, tensile strength of 565 kg/cm$^2$, tensile elongation of 70%, and heat distortion temperature of 192° C. The appearance of molded articles is good, the gloss being 70%, and the moldability is also excellent.

EXAMPLE 6

A resin composition is prepared and its physical properties are determined by using the polyamide, hydrogenated block copolymer and modified block copolymer, each employed in Example 4, in the same manner as in Example 4 except the amounts of compounded hydrogenated block copolymer and modified block copolymer are altered to 17 and 3 parts by weight, respectively. It showed good properties of an Izod impact strength of 81 kg·cm/cm, weld zone strength of 28 kg·cm/cm, flexural modulus of 20,100 kg/cm$^2$, tensile strength of 540 kg/cm$^2$, tensile elongation of 50%, and heat distortion temperature of 210° C. The appearance of molded articles is also good, the gloss being 82%, and the moldability is also excellent.

EXAMPLE 7

The polyamide, hydrogenated block copolymer and modified block copolymer, each used in Example 1, are employed. A resin composition is prepared by kneading 65 parts by weight of polyamide, 8 parts by weight of hydrogenated block copolymer and 27 parts by weight of modified block copolymer in the same manner as in Example 4, and its physical properties are determined. It showed good properties of an Izod impact strength of 125 kg·cm/cm, weld zone strength of 55 kg·cm/cm, flexural modulus of 15,200 kg/cm$^2$ and heat distortion temperature of 150° C. The appearance of molded articles is also good, the gloss being 58%, and the moldability is also excellent.

Comparative Example 1

A mixture of 75 parts by weight of the polyamide used in Example 1 and 25 parts by weight of the modified block copolymer (A) used in Example 1 is kneaded in the same manner as in Example 4, and the properties of the resulting composition are determined. It showed a low heat distortion temperature of 102° C. The appearance of molded articles is also poor, the gloss being 46%, and the moldability is also poor.

Comparative Example 2

A mixture of 75 parts by weight of the polyamide used in Example 1 and 25 parts by weight of the hydrogenated block copolymer (A) used in Example 1 is kneaded in the same manner as in Example 4, and the properties of the resulting composition are determined. It showed a low Izod impact strength of 8 kg·cm/cm and also low weld zone strength of 4 kg·cm/cm. The appearance of molded articles is very poor, the gloss being 35%.

Comparative Example 3

A mixture of 55 parts by weight of the polyamide used in Example 1, 20 parts by weight of the hydrogenated block copolymer (B) and 25 parts by weight of the modified block copolymer (G), each used in Example 4, is kneaded in the same manner as in Example 1, and the properties of the resulting composition are determined. Its flexural modulus of 11,000 kg/cm$^2$ and heat distortion temperature of 75° C. are both unsatisfactory. The appearance of molded articles is poor, the gloss being 40%.

Comparative Example 4

A mixture of 92 parts by weight of the polyamide used in Example 1, and 4 parts by weight of the hydrogenated block copolymer (B) and 4 parts by weight of the modified block copolymer (G) each used in Example 4, is kneaded in the same manner as in Example 1 to determine the properties of the resulting composition. It showed a poor Izod impact strength of 14 kg·cm/cm.

Comparative Example 5

A mixture of 55 parts by weight of the polyamide, 37 parts by weight of the hydrogenated block copolymer (A) and 8 parts by weight of the modified block copolymer (A) each used in Example 1, is kneaded in the same manner as in Example 1 to determine the properties of the resulting composition. It showed unsatisfactory flexural modulus of 11,500 kg/cm$^2$ and heat distortion temperature of 85° C. The appearance of molded articles is also poor, the gloss being 36%.

EXAMPLE 8

(1) Preparation of radial teleblock-type hydrogenated block copolymer

Styrene is polymerized in toluene solvent by use of n-butyllithium as polymerization catalyst, and then a toluene solution containing 1,3-butadiene is further added thereto. After 99% or more of the added 1,3-butadiene had been polymerized, with no deactivation being effected, silicon tetrachloride is added to the polymerization mixture to conduct coupling reaction. The polymer obtained is a block polymer principally of (polystyrene)-(polybutadiene)$_4$-silicon type, and had a melt flow index (G conditions) of 8 g/10 min and a styrene content of 30% by weight.

The radial teleblock copolymer obtained above is then hydrogenated in the same manner as in Reference Example 1 to prepare a radial teleblock-type hydrogenated block copolymer selectively hydrogenated in its butadiene portion.

(2) Preparation of radial teleblock-type modified block copolymer

A radial teleblock-type modified block copolymer is prepared in the same manner as in Reference Example 1 but by use of the radial teleblock-type hydrogenated block copolymer prepared in (1) above. The addition amount of maleic anhydride was 0.6 phr.

(3) Preparation of composition

A composition is prepared in the same manner as in Example 4 but by use of 80 parts by weight of the polyamide used in Example 1, 10 parts by weight of the hydrogenated block copolymer prepared in (1) above and 10 parts by weight of the modified block copolymer prepared in (2) above, to determine the properties of the resulting composition. It showed good properties of an Izod strength of 95 kg·cm/cm, flexural modulus of 19,500 kg/cm$^2$, tensile strength of 535 kg/cm$^2$, tensile elongation of 70%, and heat distortion temperature of 206° C. The appearance of molded articles is excellent, the gloss being 82%.

EXAMPLE 9

(1) Preparation of aromatic nylon

A mixture of 8.3 kg of terephtahlic acid and 8.3 kg of isophthalic acid, and 30 l of an aqueous solution containing 11.6 kg of hexamethylene diamine are placed in a 100 l autoclave. The resulting mixture is gradually brought to elevated temperature with stirring to reach 140° C. in 2 hours. Then it is heated up to 240° C. while being maintained under a reduced pressure of 50 to 100 mm Hg, and condensation is conducted for 3 hours. It is then further heated up to 270° C. After a predetermined molecular weight had been reached, nitrogen gas pressure was applied to the autoclave to extrude a polymer in the form of a strand. The polymer is cooled with water and then cut to obtain pellet-formed polymer.

The polyphthaloyl adipamide thus formed had a $\eta r$ of 2.3 as determined in sulfuric acid (96% $H_2SO_4$, 1% solution, 20° C.).

(2) Preparation of composition

A resin composition is obtained in the same manner as in Example 1 but by use of 80 parts by weight of the aromatic nylon prepared in (1) above, 10 parts by weight of the hydrogenated block copolymer (A) and 10 parts by weight of the modified block copolymer (A), each used in Example 1, to determine the properties of the composition. It showed good properties of an Izod impact strength of 72 kg·cm/cm, flexural modulus of 23,500 kg/cm$^2$, tensile strength of 720 kg/cm$^2$, tensile elongation of 70%, and heat distortion temperature of 125° C. The appearance of molded articles is also excellent, the gloss being 70%.

EXAMPLE 10

(1) Preparation of nylon 46

Into a 100 l autoclave are charged 20 l of an aqueous solution containing 9.4 kg of diaminobutane, and 14.6 kg of adipic acid. During the charge, the temperature of the reaction mixture is gradually increased with stirring, and brought up to 140° C. in 2 hours. Almost all of the water evolved is removed during the time. Then the pressure is reduced to 50 to 100 mmHg, the temperature is increased to 200° to 220° C., and condensation is continued for 3 hours. Then, the autoclave was once cooled, and the content is crushed and taken out. The product thus obtained is thrown into a 200 l reactor and continuously heated at 260° C. for 4 hours while nitrogen gas is being passed through at a rate of 10 l/min. The polyphthaloyl adipamide thus formed had a $\eta r$ of 3.4 as determined in sulfuric acid (96% $H_2SO_4$, 0.1% by weight solution, 20° C.).

(2) Preparation of composition

Ten parts by weight of the modified block copolymer (A) and 10 parts by weight of the hydrogenated block copolymer (A), each used in Example 1, and 80 parts by weight of nylon 46 prepared in (1) above are dry-blended in a blender and then kneaded at 315° C. in a twin screw extruder to obtain a resin composition in the form of pellets. The resin composition thus obtained is injection-molded to obtain test pieces for determination of physical properties. It showed good properties of an Izod impact strength of 82 kg·cm/cm, flexural modulus of 21,000 kg/cm$^2$ and heat distortion temperature of 260° C. The appearance of molded articles is also excellent, the gloss being 60%.

EXAMPLE 11

A mixture of 10 parts by weight of the modified block copolymer (A) and 10 parts by weight of the hydrogenated block copolymer (A), each used in Example 1, and 80 parts of nylon 6 (number average molecular weight: 20,000) is kneaded in the same manner as in Example 4 to obtain a resin composition, and its physical properties are determined. It showed good properties of an Izod impact strength of 95 kg·cm/cm, weld zone strength of 55 kg·cm/cm, flexural modulus of 18,000 kg/cm$^2$, and heat distortion temperature of 150° C. The appearance of molded articles is also excellent, the gloss being 70%.

EXAMPLE 12

A resin composition is prepared in the same manner as in Example 4 but by use of 80 parts by weight of the polyamide and 8 parts by weight of the hydrogenated block copolymer (A), each used in Example 1, and 12 parts by weight of the modified block copolymer (B) prepared in Reference Example 2, and its physical properties are determined. It showed good balance between properties, namely an Izod impact strength of 65 kg·cm/cm, weld zone strength of 30 kg·cm/cm, flexural modulus of 19,500 kg/cm$^2$, heat distortion temperature of 191° C., and gloss of 90%, and showed also a good moldability.

EXAMPLE 13

A resin composition is prepared in the same manner as in Example 1 but by use of 85 parts by weight of the polyamide and 6 parts by weight of the hydrogenated block copolymer (A), each used in Example 1, and 9 parts by weight of the modified block copolymer (E) prepared in Reference Example 2, and its physical properties are determined. It showed excellent balance between properties, namely an Izod impact strength of 78 kg·cm/cm, weld zone strength of 32 kg·cm/cm, flexural modulus of 21,000 kg/cm$^2$, heat distortion temperature of 181° C. and the appearance of molded articles as expressed by gloss of 72%, and showed also a good moldability.

EXAMPLE 14

A resin composition is prepared in the same manner as in Example 13 except that 3 parts by weight of the above-mentioned hydrogenated block copolymer (A) and 12 parts by weight of the modified block copolymer (E) prepared in Reference Example 2 are used, and its physical properties are determined. It showed excellent properties of an Izod impact strength of 75 kg·cm/cm, weld zone strength of 45 kg·cm/cm, flexural modulus of 21,000 kg/cm$^2$, heat distortion temperature of 184° C., and the appearance of molded articles as expressed by gloss of 81%, and showed also a good moldability.

EXAMPLE 15

A resin composition is prepared in the same manner as in Example 1 but by use of 75 parts by weight of the polyamide and 20 parts by weight of the hydrogenated block copolymer (A), each used in Example 1, and 5 parts by weight of the above-mentioned modified block copolymer (E), and its physical properties were determined. It showed excellent balance between properties, namely an Izod impact strength of 105 kg·cm/cm, weld zone strength of 52 kg·cm/cm, flexural modulus of 18,000 kg/cm$^2$, heat distortion temperature of 161° C., and the appearance of molded articles as expressed by gloss of 72%, and showed also a good moldability.

EXAMPLE 16

A resin composition was prepared in the same manner as in Example 1 but by use of 75 parts by weight of the polyamide and 5 parts by weight of the hydrogenated block copolymer (A), each used in Example 1, and 20 parts by weight of the modified block copolymer (C) prepared in Reference Example 2, and its physical properties were determined. It showed excellent balance between properties, namely and Izod impact strength of 70 kg·cm/cm, weld zone strength of 35 kg·cm/cm, flexural modulus of 18,000 kg/cm$^2$, heat distortion temperature of 188° C., and the appearance of molded articles as expressed by gloss of 88%, and showed also a good moldability.

EXAMPLE 17

A resin composition was prepared in the same manner as in Example 16 except that 20 parts by weight of the above-mentioned hydrogenated block copolymer (A), and 5 parts by weight of the modified block copolymer (D) prepared in Reference Example 2 are used, and its physical properties are determined. It showed excellent balance between properties, namely an Izod impact strength of 62 kg·cm/cm, weld zone strength of 42 kg·cm/cm, flexural modulus of 18,500 kg/cm$^2$, heat distortion temperature of 196° C., and the appearance of molded articles as expressed by gloss of 77%, and showed also a good moldability.

EXAMPLE 18

A resin composition is prepared in the same manner as in Example 16 except that the amount of the above-mentioned hydrogenated block copolymer (A) and that of the above-mentioned modified block copolymer (C) are altered to 15 and 10 parts by weight respectively, and its physical properties were determined. It showed excellent balance between properties, namely an Izod impact strength of 58 kg·cm/cm, weld zone strength of 35 kg·cm/cm, flexural modulus of 18,500 kg/cm$^2$, heat distortion temperature of 203° C., and the appearance of molded articles (gloss) of 85%, and also a good moldability.

EXAMPLE 19

A resin composition is prepared in the same manner as in Example 16 except that 20 parts by weight of the above-mentioned hydrogenated block copolymer (A) and 5 parts by weight of the above-mentioned modified block copolymer (G) were used, and its physical properties are determined. It showed excellent properties of an Izod impact strength of 101 kg·cm/cm, weld zone strength of 32 kg·cm/cm, flexural modulus of 17,500 kg/cm$^2$, heat distortion temperature of 191° C., and the appearance of molded articles as expressed by gloss of 78%, and showed also a good moldability.

EXAMPLE 20

A resin composition is prepared in the same manner as in Example 13 except that 3 parts by weight of the above-mentioned hydrogenated block copolymer (A) and 12 parts by weight of the above-mentioned modified block copolymer (G) are used, and its physical properties are determined. It showed excellent properties of an Izod impact strength of 72 kg·cm/cm, weld zone strength of 46 kg·cm/cm, flexural modulus of 21,500 kg/cm$^2$, heat distortion temperature of 189° C., and the appearance of molded articles as expressed by gloss of 65%, and showed also a good moldability.

Comparative Example 6

A resin composition is obtained in the same manner as in Example 14 except that the amount of the modified block copolymer (F) prepared in Reference Example 2 is altered to 12 parts by weight, and its physical properties are determined.

It showed a low heat distortion temperature of 120° C., poor appearance of molded articles as expressed by gloss of 47%, and also poor moldability.

Figure 4:
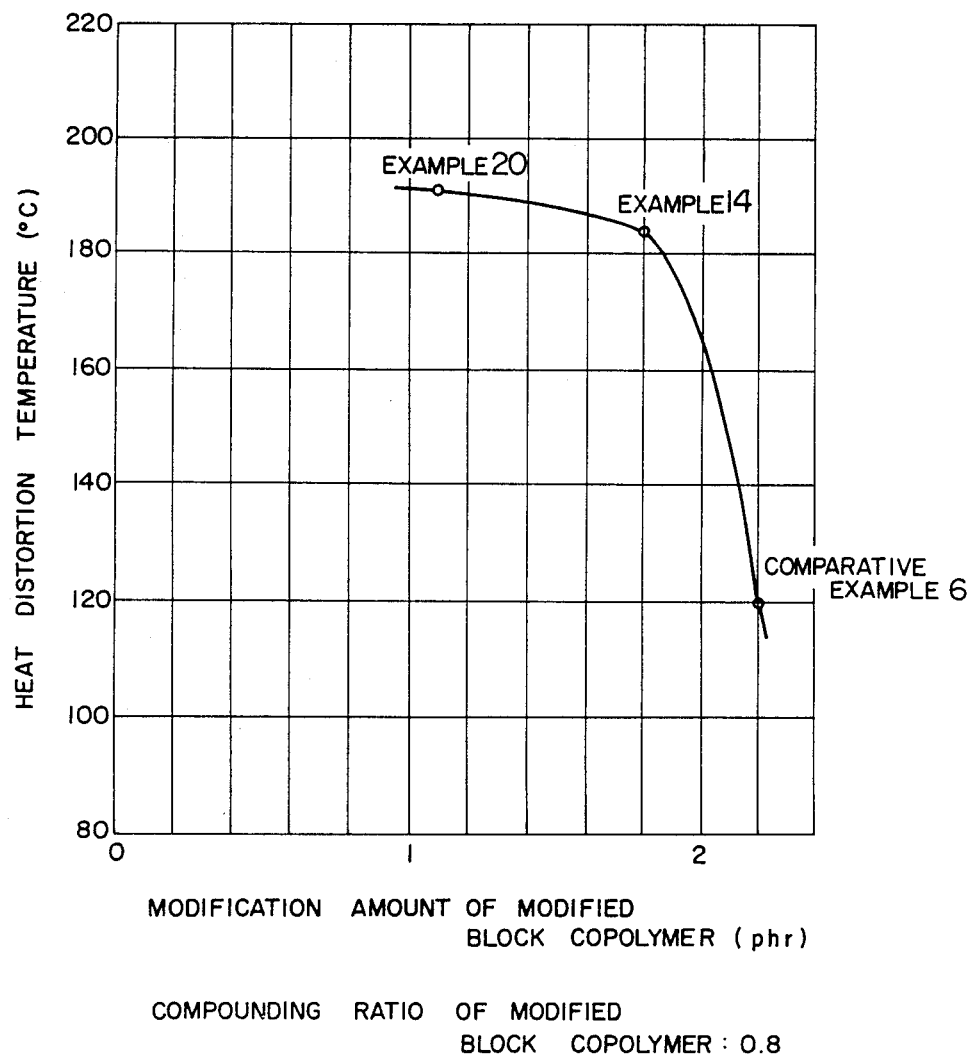
FIG. 4 is a graph showing the relationship between the modification amount of modified block copolymer and heat distortion temperature for a composition comprising polyamide, hydrogenated block copolymer and modified block copolymeer (hereinafter referred to as hydrogenated block copolymer-type composition) wherein the compounding ratio of the modified block copolymer is 0.8.

Comparison with Examples 14 and 20 reveals that, as shown in FIG. 4, the heat distortion temperature decreases markedly when the modification amount of modified block copolymer exceeds 2 phr.

Comparative Example 7

A resin composition is prepared in the same manner as in Example 13 except that 9 parts by weight of the above-mentioned modified block copolymer (F) is used, and its physical properties are determined.

It showed a low heat distortion temperature of 135° C. and poor appearance of molded articles as expressed by gloss of 45%. Comparison with Example 13 reveals that heat distortion temperature and the appearance of molded articles are poor when the modification amount of modified block copolymer exceeds 2 parts by weight.

Comparative Example 8

A resin composition is prepared in the same manner as in Example 14 except that the hydrogenated block copolymer is not used and 15 parts by weight of the modified block copolymer (E) was used, and its physical properties are determined.

It showed a low heat distortion temperature 111° C., an appearance of molded articles as expressed by gloss of 35%, and also a poor moldability.

Figure 5:
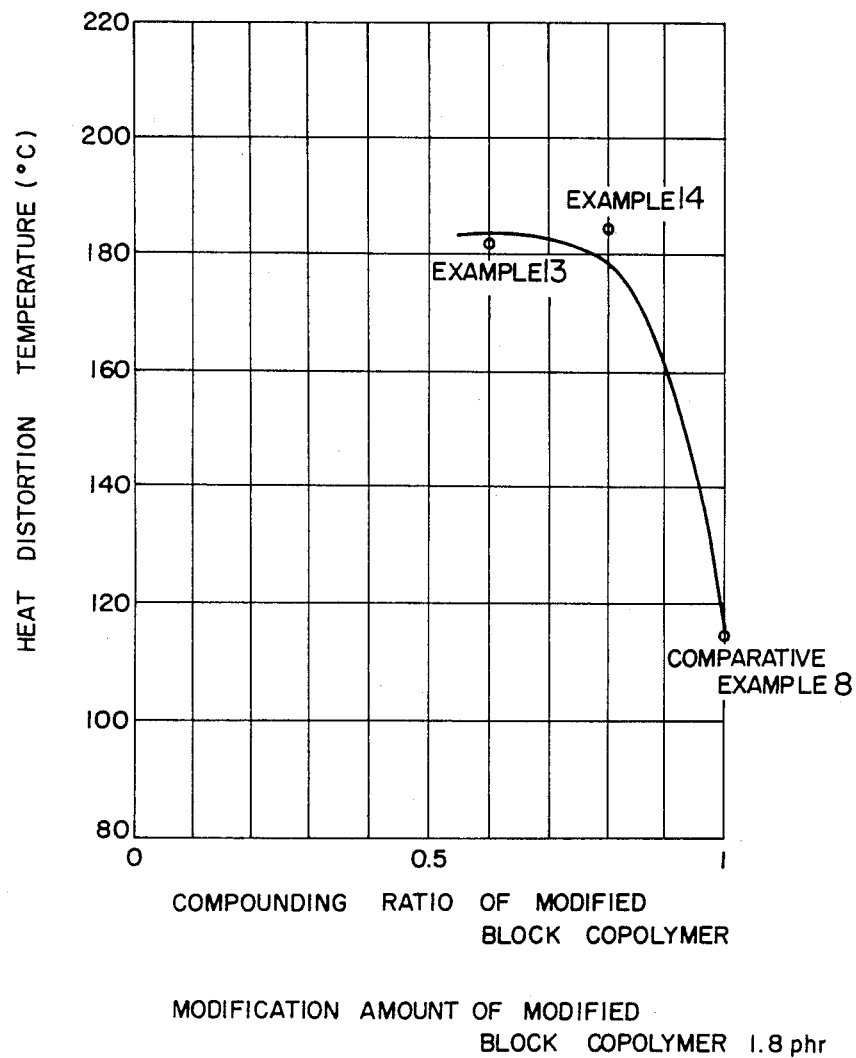
FIG. 5 is a graph showing the relationship between the compounding ratio of modified block copolymer and heat distortion temperature for a hydrogenated block copolymer-type composition wherein the modification amount of modified block copolymer is 1.8 phr.

Comparison with Examples 13 and 14 reveals that, as shown in FIG. 5, the heat distortion temperature decreases markedly when the compounding ratio of modified block copolymer exceeds 0.9.

Comparative Example 9

A resin composition is prepared in the same manner as in Example 15 except that 20 parts by weight of the hydrogenated block copolymer (A) and 5 parts by weight of the above-mentioned modified block copolymer (F) is used, and its physical properties are determined.

It showed a low heat distortion temperature of 118° C. and poor appearance of molded articles as expressed by a gloss of 45%.

Figure 6:
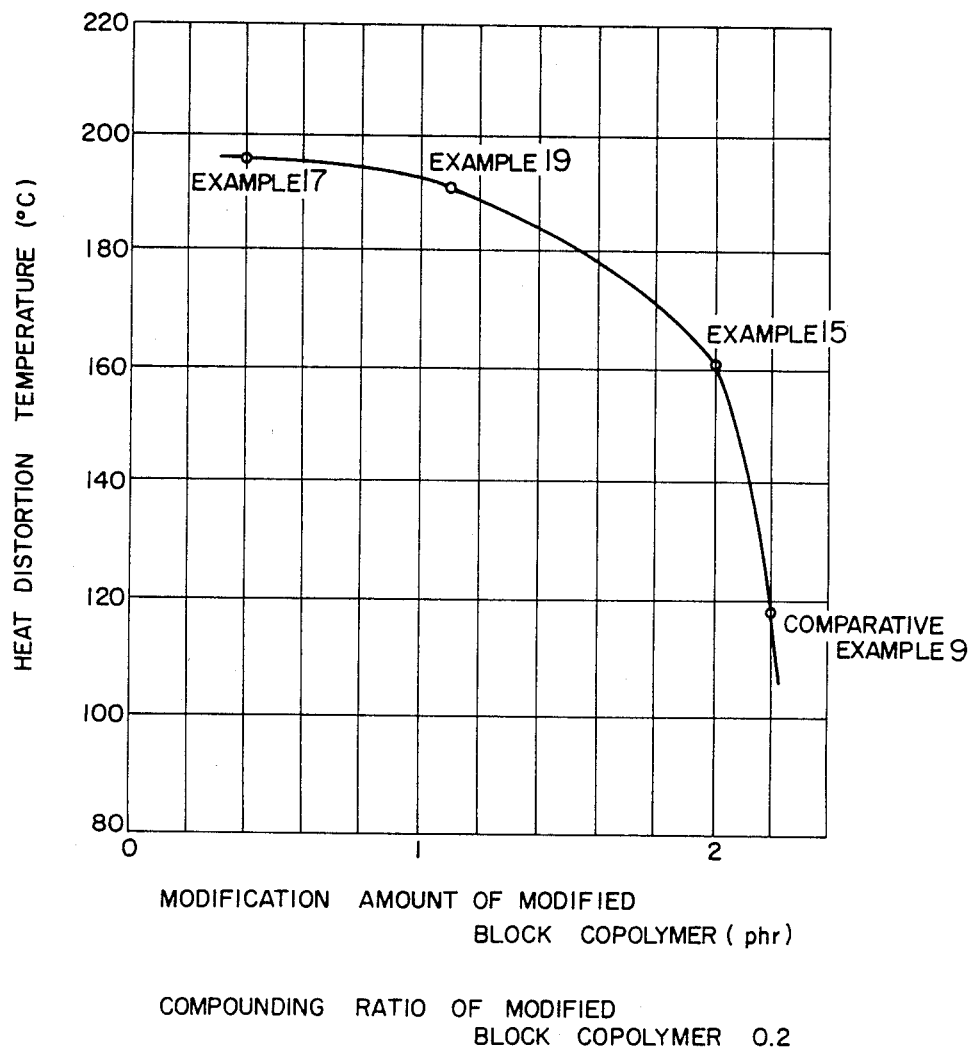
FIG. 6 is a graph showing the relationship between the modification amount of modified block copolymer and heat distortion temperature for a hydrogenated block copolymer-type composition wherein the compounding ratio of modified block copolymer is 0.2.

Comparison with Examples 15, 17 and 19 reveals that, as shown in FIG. 6, the heat distortion temperature is steeply lowered when the modification amount of modified block copolymer exceeds 2 phr.

Comparative Examples 10

A resin composition is prepared in the same manner as in Example 4 except that 19 parts by weight of the hydrogenated block copolymer (B) and 1 part by weight of the above-mentioned modified block copolymer (G) are used. Determination of its physical properties showed a low Izod impact strenght of 18 kg·cm/cm.

Figure 7:
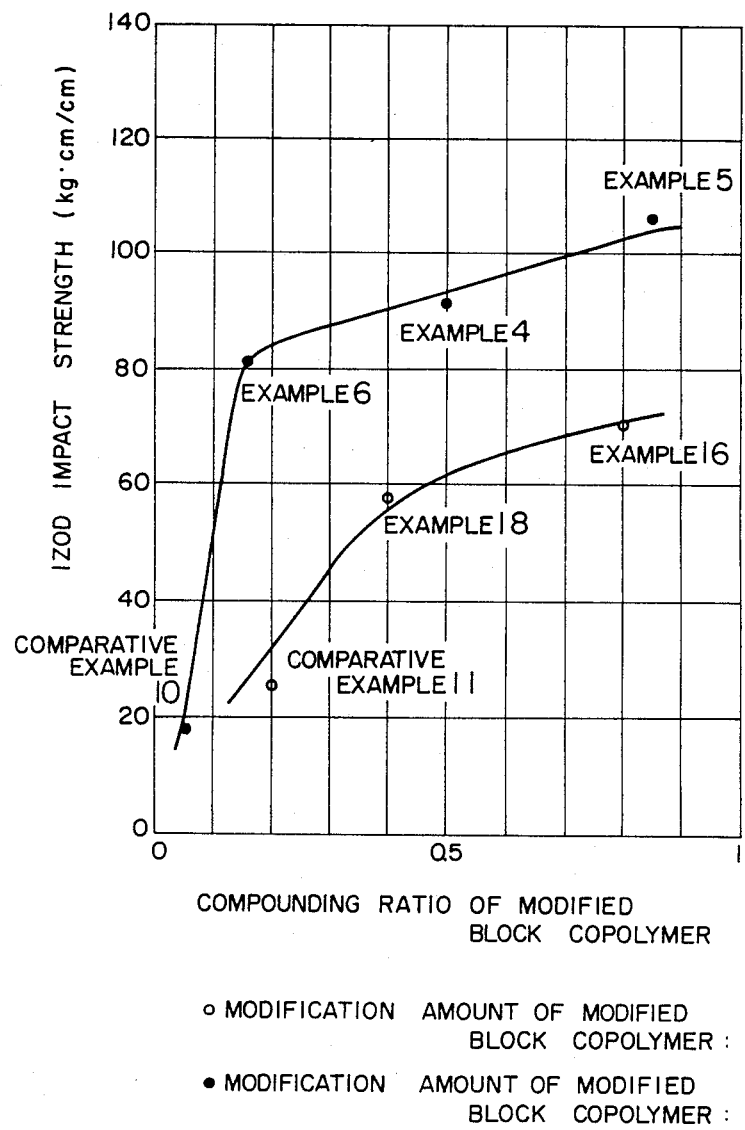
FIG. 7 is a graph showing the relationship between the compounding ratio of modified block copolymer and Izod impact strength for a hydrogenated block copolymer-type composition wherein the modification amount of modified block copolymer is 0.2 phr and 1.1 phr.

Comparison with Examples 4, 5 and 6 reveals that, as shown in FIG. 7, the Izod impact strength is markedly lowered when the compounding ratio of modified block copolymer becomes less than 0.1.

Comparative Example 11

A resin composition is prepared in the same manner as in Example 16 except that the amount of the hydrogenated block copolymer (A) and that of the modified block coploymer (C) are altered to 20 and 5 parts by weight respectively, and its physical properties were determined. It showed a good flexural modulus, thermal resistance etc., but a low Izod impact strength of 25 kg·cm/cm.

Comparison with Examples 17 and 18 reveals that the Izod impact strength decreased markedly when the values of the modification amount x (phr) of modified block copolymer and the compounding ratio y of modified block copolymer are outside the range defined by the expression $y \geq -x + 0.5$.

Comparison with Examples 16 and 18 reveals that, as shown in FIG. 7, only a low Izod impact strength is obtained when the valve of x and y are outside the range of $y \geq -x + 0.5$ even if they are in the range of $0.1 \leq x \leq 2.0$ and $0.1 \leq y \leq 0.9$.

Comparative Example 12

A resin composition is prepared in the same manner as in Example 16 except that no hydrogenated block copolymers and 25 parts by weight of the modified block copolymer (C) were used, and its physical properties are determined. It showed a low heat distortion temperature of 130° C.

Figure 8:
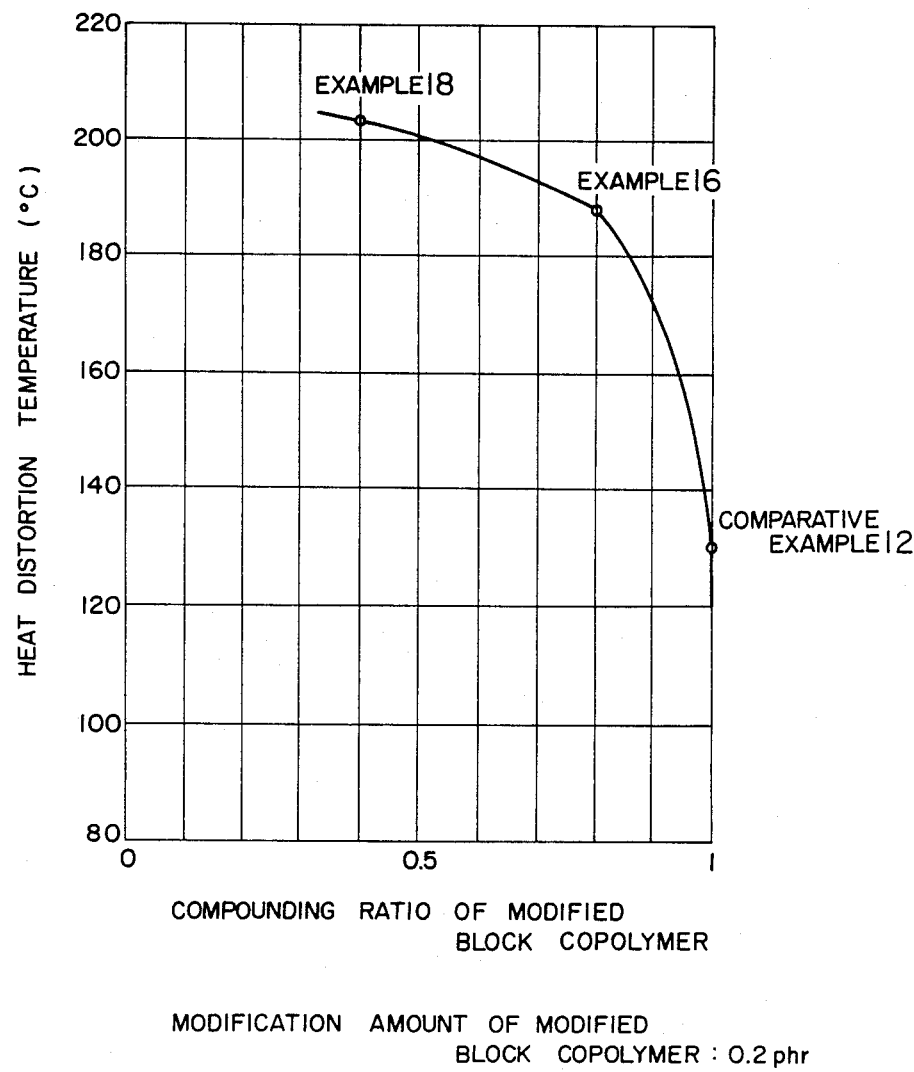
FIG. 8 is a graph showing the relationship between the compounding ratio of modified block copolymer and heat distortion temperature for a hydrogenated block copolymer-type composition wherein the modification amount of modified block copolymer is 0.2 phr.

Comparison with Examples 16 and 18 reveals that, as shown in FIG. 8, the heat distortion temperature decreased markedly when the compounding ratio of modified block copolymer exceeds 0.9.

EXAMPLE 21

Ten parts by weight of the modified block copolymer (H) prepared in Reference Example 2, 10 parts by weight of an ethylene-propylene copolymer (Toughmer ® P 0180, melt flow index: 4.5 g/10 min. mfd. by Mitsui Petrochemical Industries, Ltd.) as an ethylene-containing polymer, and 80 parts by weight of nylon 66 (number average molecular weight: 18,000) are dry-blended in a blender, and melt-kneaded by use of a twin screw extruder at 290° C. to obtain a resin composition in the form of pellets. The resin composition obtained is injection-molded to give test pieces, and the physical properties are determined. It showed excellent properties of an Izod impact strength of 96 kg·cm/cm, weld zone strength of 50 kg·cm/cm, flexural modulus of 20,500 kg/cm², tensile strength of 520 kg/cm², tensile elongation of 65%, and heat distortion temperature of 180° C., and showed also a good appearance of molded articles.

EXAMPLE 22

A resin composition is obtained in the same manner as in Example 21 except that the compounding amounts of the polyamide, modified block copolymer and ethylene-containing polymer, each used in Example 21, are altered to 70 parts by weight, 15 parts by weight and 15 parts by weight, respectively, and its physical properties were determined. It showed good properties of an Izod impact strength of 106 kg·cm/cm, weld zone strength of 58 kg·cm/cm, flexural modulus of 15,700 kg/cm², tensile strength of 460 kg/cm², tensile elongation of 85%, and heat distortion temperature of 160° C., and showed also a good appearance of molded articles.

EXAMPLE 23

The polyamide, modified block copolymer and ethylene-containing polymer, each employed in Example 21, are used to obtain a resin composition in the same manner as in Example 21 except that the compounding amounts of the modified block copolymer and ethylene-containing polymer are altered to 5 and 15 parts by weight, respectively. Determination of its physical properties showed excellent properties of an Izod impact strength of 90 kg·cm/cm, weld zone strength of 45 kg·cm/cm, flexural modulus of 21,300 kg/cm², tensile strength of 540 kg/cm², tensile elongation of 50% and heat distortion temperature of 201° C., and showed also a good appearance of molded articles.

EXAMPLE 24

The polyamide, modified block copolymer and ethylene-containing polymer, each employed in Example 21, are used to obtain a resin Composition in the same manner as in Example 21 except that the compounding amounts of the modified block copolymer and ethylene-containing polymer are altered to 15 and 5 parts by weight, respectively. Determination of its physical properties showed excellent properties of an Izod impact strength of 103 kg·cm/cm, weld zone strength of 46 kg·cm/cm, flexural modulus of 20,100 kg/cm², tensile strength of 510 kg/cm², tensile elongation of 70% and heat distortion temperature of 182° C., and showed also a good appearance of molded articles.

EXAMPLE 25

A resin composition is obtained in the same manner as in Example 21 except that the compounding amounts of the polyamide, modified block copolymer and ethylene-containing copolymer, each employed in Example 21, are altered to 85, 10 and 5 parts by weight, respectively. The determination of its physical properties showed excellent properties of an Izod impact strength of 62 kg·cm/cm, weld zone strength of 35 kg·cm/cm, flexural modulus of 23,000 kg/cm², and heat distortion temperature of 212° C., and showed also a good appearance of molded articles.

EXAMPLE 26

Ten parts by weight of the modified block copolymer (N) prepared in Reference Example 2, 10 parts by weight of an ethylene-butene copolymer (Toughmer ® A-4090, mfd. by Mitsui Petrochemical Industries, Ltd., melt flow index: 3.6 g/min) as an ethylene-containing polymer and 80 parts by weight of nybon 6 (average molecular weight: 20,000) were dry-blended in a blender and the resulting mixture was melt-kneaded by use of a twin screw extruder at 290° C. to obtain a resin composition in the form of pellets. The resin composition thus obtained is injection-molded to give test pieces for determination of physical properties. The composition showed excellent properties of an Izod impact strength of 101 kg·cm/cm, weld zone strength of 65 kg·cm/cm, flexural modulus of 17,000 kg/cm$^2$ and heat distortion temperature of 150° C., and showed also a good appearance of molded articles.

EXAMPLE 27

Ten parts by weight of the modified block copolymer used in Example 26, 25 parts by weight of the ethylene-containing polymer used in Example 26, and 65 parts by weight of the polyamide used in Example 21 are blended and kneaded in the same manner as in Example 26 to obtain a resin composition, and its physical properties are determined. It showed excellent properties of an Izod impact strength of 125 kg·cm/cm, weld zone strength of 75 kg·cm/cm, flexural modulus of 15,000 kg/cm$^2$ and heat distortion temperature of 155° C., and showed also a good appearance of molded articles.

EXAMPLE 28

Twenty-five parts by weight of the modified block copolymer used in Example 26, 10 parts by weight of the ethylene-containing polymer used in Example 26 and 65 parts by weight of the polyamide used in Example 21 are blended and kneaded in the same manner as in Example 26 to obtain a resin composition, and its physical properties are determined. It showed excellent properties of an Izod impact strength of 125 kg·cm/cm, weld zone strength of 50 kg·cm/cm, flexural modulus of 14,500 kg/cm$^2$ and heat distortion temperature of 150° C., and showed also a good appearance of molded articles.

EXAMPLE 29

Three parts by weight of the modified block copolymer used in Example 26, 27 parts by weight of the ethylene-containing polymer used in Example 26, and 70 parts by weight of the polyamide used in Example 21 were mixed and kneaded in the same manner as in Example 26 to obtain a resin composition, and its physical properties were determined. It showed excellent properties of an Izod impact strength of 60 kg·cm/cm, weld zone strength of 21 kg·cm/cm, flexural modulus of 16,000 kg/cm$^2$, and heat distortion temperature of 180° C., and showed also a good appearance of molded articles.

EXAMPLE 30

Ten parts by weight of the modified block copolymer used in Example 26, 10 parts by weight of an ethylene-propylene-dicyclopentadiene copolymer (EPTX-75, a trade name, mfd. by Mitsui Petrochemical Industries, Ltd., melt flow index: 5 g/10 min) as an ethylene-containing polymer, and 80 parts by weight of the polyamide used in Example 21 were mixed and kneaded in the same manner as in Example 26 to obtain a resin composition, and its physical properties were determined. It showed excellent properties of an Izod impact strength of 105 kg·cm/cm, weld zone strength of 52 kg·cm/cm, flexural modulus of 18,000 kg/cm$^2$, and heat distortion temperature of 173° C., and showed also a good appearance of molded articles.

EXAMPLE 31

Eight parts by weight of the modified block copolymer used in Example 26, 6 parts by weight each of the ehtylene-containing polymer used in Example 21 and an ethylene-vinyl acetate copolymer (Evaflex P 1407, a trade name, mfd, by Du Pont-Mitsui Polychemical Co., Ltd., melt flow index: 15 g/10 min, vinyl acetate content: (14%) each as an ethylene-containing polymer, and 80 parts by weight of the polyamid used in Example 21 are mixed and kneaded in the same manner as in Example 26 to obtain a resin composition, and its physical properties are determined. It showed excellent properties of an Izod impact strength of 95 kg·cm/cm, weld zone strength of 47 kg·cm/cm, flexural modulus of 19,500 kg/cm$^2$, and heat distortion temperature of 191° C., and showed also a good appearance of molded articles.

EXAMPLE 32

Five parts by weight of the modified block copolymer used in Example 26, 12 parts by weight of the ethylene-containing polymer used in Example 21 and 3 parts by weight of a polyethylene (density: 0.93, softening point: 105° C., viscosity average molecular weight: 8,000) each as an ethylene-containing polymer, and 80 parts by weight of the polyamide used in Example 21 were mixed and kneaded in the same manner as in Example 26 to obtain a resin composition, and its physical properties were determined. It showed excellent properties of an Izod impact strength of 82 kg·cm/cm, weld zone strength of 40 kg·cm/cm, flexural modulus of 19,000 kg/cm$^2$, and heat distortion temperature of 175° C., and showed also a good appearance of molded articles.

EXAMPLE 23

Ten parts by weight of the modified block copolymer used in Example 26, 10 parts by weight of an ethylene-butene copolymer (Toughmer ® A-20090, a trade name, mfd. by Mitsui Petrochemical Industries, Ltd., melt flow index: 18 g/min) and 5 parts by weight of an ethylene-ethyl acrylate copolymer (DPDJ-6169, a trade name, mfd. by Nippon Unicar Co., Ltd., ethyl acrylate content: 18%, melt flow index: 6 g/10 min) each as an ethylene-containing polymer, and 75 parts by weight of the polyamide used in Example 21 are mixed and kneaded in the same manner as in Example 26 to obtain a resin composition, and its physical properties are determined. It showed excellent properties of an Izod impact strength of 115 kg·cm/cm, weld zone strength of 42 kg·cm/cm, flexural modulus of 17,000 kg/cm$^2$, and heat distortion temperature of 175° C., and also showed a good appearance of molded articles.

COMPARATIVE EXAMPLE 13

Eighty parts by weight of the polyamide used in Example 21 and 20 parts by weight of the modified block copolymer used in Example 21 are uniformly dry-blended in a blender. The mixture is then molten at 290° C. by use of a twin screw extruder to obtain a resin composition in the form of pellets. Test pieces are prepared from the composition by injection molding to determine its physical properties. It showed a low weld zone strength of 8 kg·cm/cm and also a poor appearance of molded articles, haze being developed.

COMPARATIVE EXAMPLE 14

Eighty parts by weight of the polyamide used in Example 21 and 20 parts by weight of the ethylene-containing polymer used in Example 21 are kneaded and the physical properties of the composition thus obtained are determined in the same manner as in Comparative Example 13. It showed a low Izod impact strength of 8 kg·cm/cm and weld zone strength of 2 kg·cm/cm, and also a poor appearance of molded articles, haze being developed.

COMPARATIVE EXAMPLE 15

Ninety-two parts by weight of the polyamide used in Example 21, 4 parts by weight of the modified block copolymer used in Example 21 and 4 parts by weight of the ethylene-containing polymer used in Example 21 are kneaded and the physical properties of the resulting composition are determined in the same manner as in Example 21. It showed a poor Izod impact strength of 14 kg·cm/cm and weld zone strength of 5 kg·cm/cm.

COMPARATIVE EXAMPLE 16

Fifty-six parts by weight of the polyamide used in Example 21, 11 parts by weight of the modified block copolymer used in Example 21, and 33 parts by weight of the ethylene-containing polymer used in Example 21 are kneaded and the physical properties of the resulting composition are determined in the same manner as in Example 21. It showed unsatisfactory properties of a weld zone strength of 35 kg·cm/cm, flexural modulus of 11,700 kg/cm$^2$ and heat distortion temperature of 85° C., and also showed a poor appearance of molded articles, haze being developed.

COMPARATIVE EXAMPLE 17

The physical properties of a resin composition are determined in the same manner as in Example 26 except that the modified block copolymer, ethylene-containing polymer adn polyamide, each used in Example 26, are employed in compounding amounts of 50, 5 and 55 parts by weight, respectively. The composition showed poor properties of a weld zone strength of 10 kg·cm/cm and heat distortion temperature of 85° C., and also showed an unsatisfactory appearance of molded articles, the gloss being low.

EXAMPLE 34

Eighty parts by weight of the aromatic nylon used in Example 9, 10 parts each by weight of the modified block copolymer (A) used in Example 1, and the ethylene-containing polymer used in Example 21 are employed to obtain a reson composition in the same manner as in Example 21, and its physical properties are determined. It showed good properties of an Izod impact strength of 72 kg·cm/cm, weld zone strength of 38 kg·cm/cm, flexural modulus of 24,000 kg/cm$^2$, and heat distortion temperature of 125° C., and also showed a good appearance of molded articles.

EXAMPLE 35

Ten parts by weight of the modified block copolymer used in Example 21, 10 parts by weight of the ethylene-containing polymer used in Example 21 and 80 parts by weight of the nylon 46 synthesized in Example 10 were dry-blended in a blender, and then kneaded at 315° C. by use of a twin screw extruder to obtain a resin composition in the form of pellets. The resin composition obtained is injection-molded to obtain test pieces, and its physical porperties were determined. It showed excellent properties of an Izod impact strength of 75 kg·cm/cm, weld zone strength of 45 kg·cm/cm, flexural modulus of 21,000 kg/cm$^2$, and heat distortion temperature of 260° C., and also showed a good appearance of molded articles.

EXAMPLE 36

A mixture of 5 parts by weight of the modified block copolymer (I) prepared in Refernce Example 2, 80 parts by weight of the polyamide used in Example 21 and parts by weight of the ethylene-containing polymer used in Example 21 are kneaded in the same manner as in Example 21 to obtain a resin composition, and its physical properties are determined. It showed excellent properties of an Izod impact strength of 97 kg·cm/cm, weld zone strength of 50 kg·cm/cm, flexural modulus of 20,400 kg/cm$^2$ and heat distortion temperature of 185° C., and also showed a good appearance of molded articles, the gloss being 75%, and good moldability.

EXAMPLE 37

A resin composition is prepared in the same manner as in Example 36 except that the compounding amounts of the modified block copolymer and ethylene-containing polymer, each used in Example 36, are altered to 15 and 5 parts by weight respectively, and its physical properties are determined. It showed excellent properties of an Izod impact strength of 111 kg·cm/cm, weld zone stength of 40 kg·cm/cm, flexural modulus of 20,000 kg/cm$^2$, and heat distortion temperature of 170° C., and also showed a high gloss of 56% and good moldability as well as good appearance of molded articles.

EXAMPLE 38

A mixture of 5 parts by weight of the modified block copolymer (J) prepared in Reference Example, 2, 15 parts by weight of the ethylene-containing polymer used in Example 21 and 80 parts by weight of the polyamide used in Example 21 are kneaded in the same manner as in Example 21, and the physical properties of the resulting composition are determined. It showed excellent properties of an Izod impact strength of 75 kg·cm/cm, flexural modulus of 21,000 kg/cm$^2$, weld zone strength of 46 kg·cm/cm and heat distortion temperature of 200° C., and also showed a high gloss of 90% and good appearance of molded articles as well as good moldability.

EXAMPLE 39

A resin composition is obtained by use of 10 parts by weight of the modified block copolymer (K) prepared in Reference Example 2, 10 parts by weight of the ethylene-containing polymer used in Example 21 and 80 parts by weight of the polyamide used in Example 21 in the same manner as in Example 1, and its physical properties are determined. It showed excellent properties of an Izod impact strength of 63 kg·cm/cm, weld zone strength of 43 kg·cm/cm, flexural modulus of 21,500 kg/cm² and heat distortion temperature of 208° C., and also showed a high gloss of 86% and good moldability as well as good appearance of molded articles.

EXAMPLE 40

A resin composition is obtained by use of the polyamide, modified block copolymer and ethylene-containing polymer, each used in Example 39, in the same manner as in Example 39 except that the compounding amounts of the modified block copolymer adn ethylene-containing polymer are altered to 15 and 5 parts by weight respectively, and its physical properties are determined. It showed excellent properties of an Izod impact strength of 70 kg·cm/cm, weld zone strength of 40 kg·cm/cm, flexural modulus of 21,100 kg/cm², and heat distortion temperature of 203° C., and also showed a high gloss of 80% and good moldability as well as good appearance of molded articles.

COMPARATIVE EXAMPLE 18

A mixture of 20 parts by weight of the modified block copolymer used in Example 36 and 80 parts by weight of the polyamide used in Example 21 is kneaded in the same manner as in Example 1, and the physical properties of the resulting composition are determined. It showed a low weld zone strength of 10 kg·cm/cm and also a poor moldability.

Figure 9:
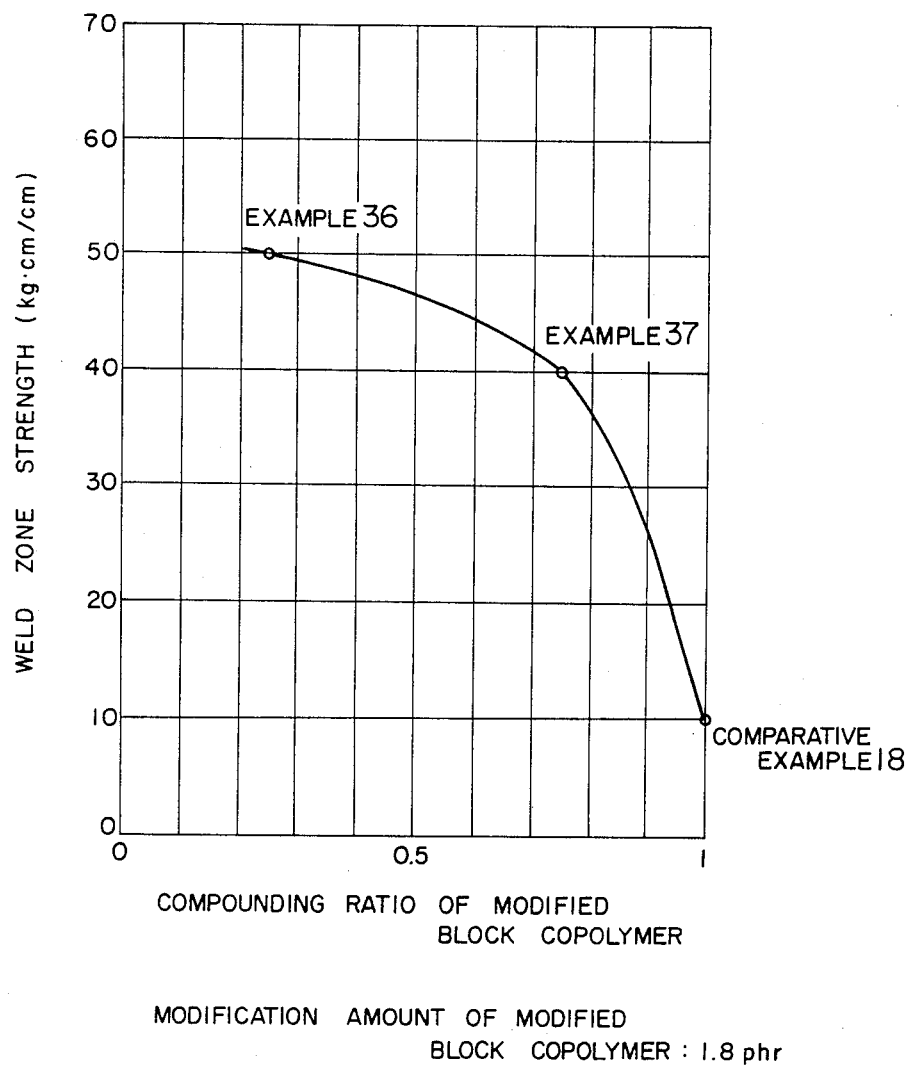
FIG. 9 is a graph showing the relationship between the compounding ratio of modified block copolymer and weld zone strength for a composition comprising polyamide, ethylene-containing polymer and modified block copolymer (hereinafter referred to as ethylene-containing polymer-type composition).

Comparison with Examples 36 and 37 reveals that, as shown in FIG. 9, the weld zone strength decreases steeply when the compounding ratio of modified block copolymer exceeds 0.9.

COMPARATIVE EXAMPLE 19

A mixture of 80 parts by weight of the polyamide used in Example 39, 5 parts by weight of the modified block copolymer used in Example 39, and 15 parts by weight of the ethylene-containing polymer used in Example 39 are kneaded in the same manner as in Example 39, and the physical properties of the resulting composition are determined. It showed poor properties of an Izod impact strength of 11 kg·cm/cm and weld zone strength of 9 kg·cm/cm.

Figure 10:
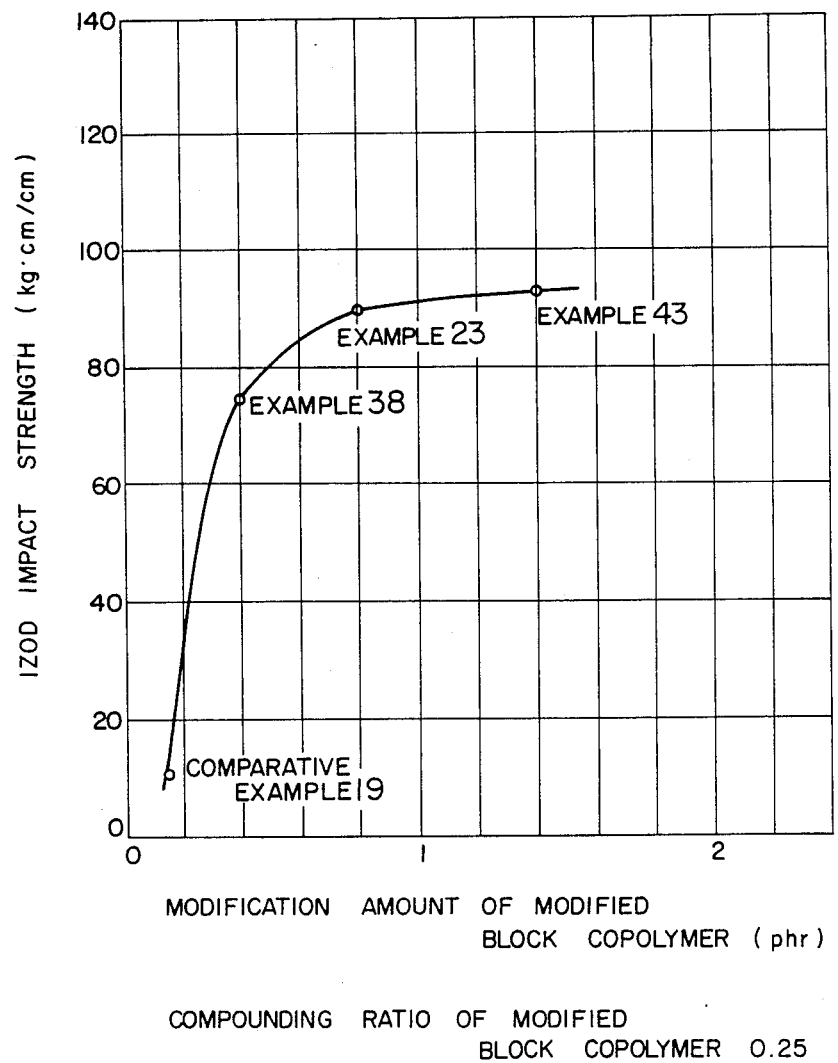
FIG. 10 is a graph showing the relationship between the modification amount of modified block copolymer and Izod impact strength for an ethylene-containing polymer-type composition wherein the compounding ratio of modified block copolymer is 0.25.

Comparison with Examples 23 and 38 reveals that, as shown in FIG. 10, the Izod impact strength decrease when the modification amount x and compounding ratio y of the modified block copolymer are outside the range defined by the expression $y \geq -x + 0.5$ even if they are within the range of $0.1 \leq y \leq 0.9$ and $0.1 \leq x \leq 2.0$.

EXAMPLE 41

A resin composition is obtained in the same manner as in Example 39 except that the compounding amounts of the polyamide, modified block copolymer, and ethylene-containing polymer, each used in Example 39, are altered to 75 parts by weight, 12.5 parts by weight and 12.5 parts by weight respectively, and its physical properties are determined. It showed excellent properties of an Izod impact strength of 80 kg·cm/cm, weld zone strength of 42 kg·cm/cm, flexural modulus of 18,500 kg/cm², and heat distortion temperature of 174° C., and also showed a high gloss of 70% and good moldability as well as good appearance of molded articles.

EXAMPLE 42

A resin composition is obtained in the same manner as in Example 39 except that the compounding amounts of the polyamide, modified block copolymer and ethylene-containing polymer, each used in Example 39, are altered to 75, 17.5 and 7.5 parts by weight respectively, and its physical properties are determined. It showed excellent properties of an Izod impact strength of 85 kg·cm/cm, weld zone strength of 38 kg·cm/cm, flexural modulus of 18,000 kg/cm² and heat distortion temperature of 168° C., and also showed a high gloss of 62% and good moldability as well as good appearance of molded articles.

EXAMPLE 43

A mixture of 5 parts by weight of the modified block copolymer (M), 15 parts by weight of the ethylene-containing polymer used in Example 21 and 80 parts by weight of the polyamide used in Example 21 is kneaded in the same manner as in Example 21 to obtain a resin composition, and its physical properties are determined. It showed excellent properties of an Izod impact strength of 93 kg·cm/cm, weld zone strength of 52 kg·cm/cm, flexural modulus of 20,700 kg/cm² and heat distortion temperature of 187° C., and also showed a high gloss of 78% and good moldability as well as good appearance of molded articles.

COMPARATIVE EXAMPLE 20

A resin composition is obtained in the same manner as in Example 21 but by use of 5 parts by weight of the modified block copolymer (L) prepared in Reference Example 2, 15 parts by weight of the ethylene-containing polymer and 80 parts by weight of the polyamide each used in Example 21, and its physical properties are determined. It showed poor properties of a weld zone strength of 12 kg·cm/cm and gloss of 47%.

Figure 11:
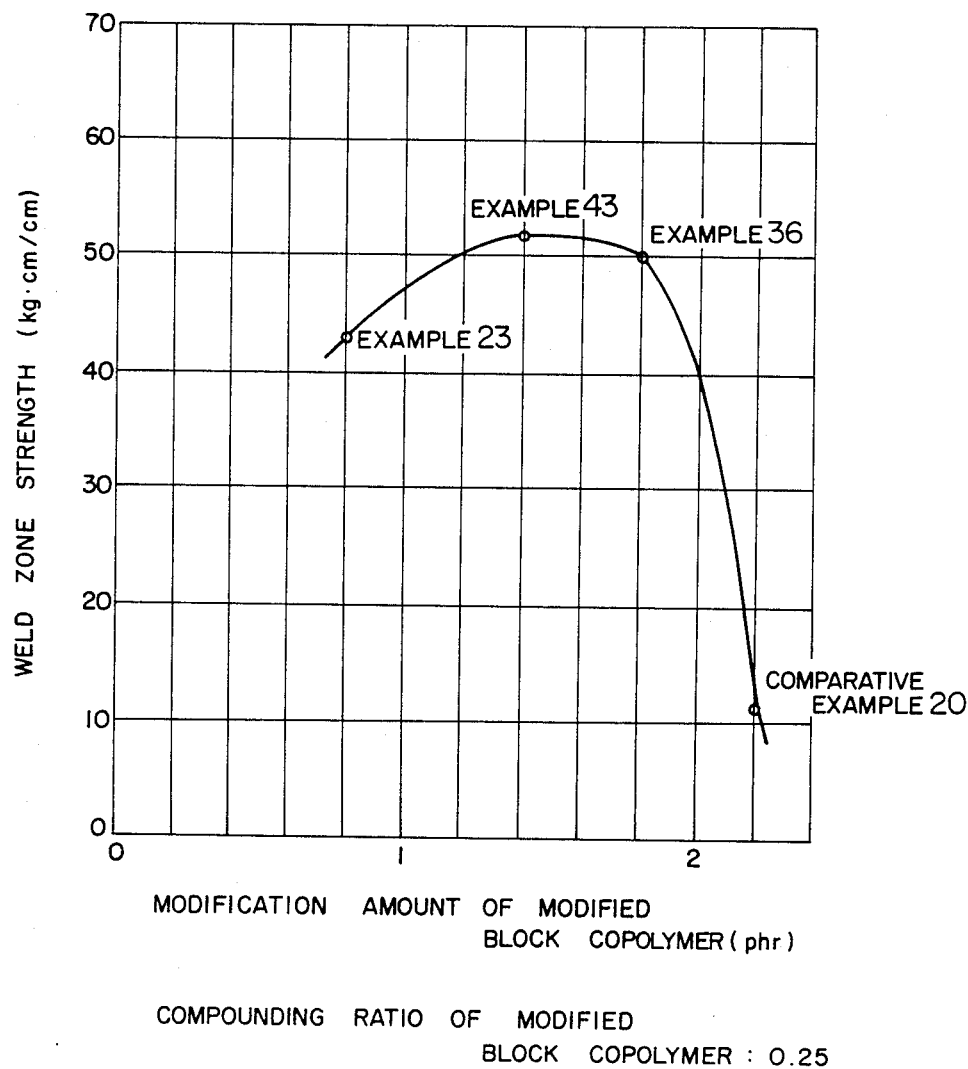
FIG. 11 is a graph showing the relationship between the modification amount of modified block copolymer and weld zone strength for an ethylene-containing polymer-type composition wherein the compounding ratio of modified block copolymer is 0.25.

Comparison with Examples 23, 36, 38 and 43 and Comparative Example 19 reveals that, as shown in FIG. 11, the weld zone strength decreases steeply when the modification amount of modified block copolymer exceeds 2 phr.

COMPARATIVE EXAMPLE 21

A resin composition is prepared by use of the polyamide, modified block copolymer and ethylene-containing polymer, each used in Comparative Example 20, in the same manner as in Comparative Example 20 except that the compounding amounts of the modified block copolymer and ethylene-containing polymer are altered to 15 and 5 parts by weight respectively, and its physical properties are determined. It showed poor properties of a weld zone strength of 10 kg·cm/cm, heat distortion temperature of 102° C., and gloss of 38%.

Figure 12:
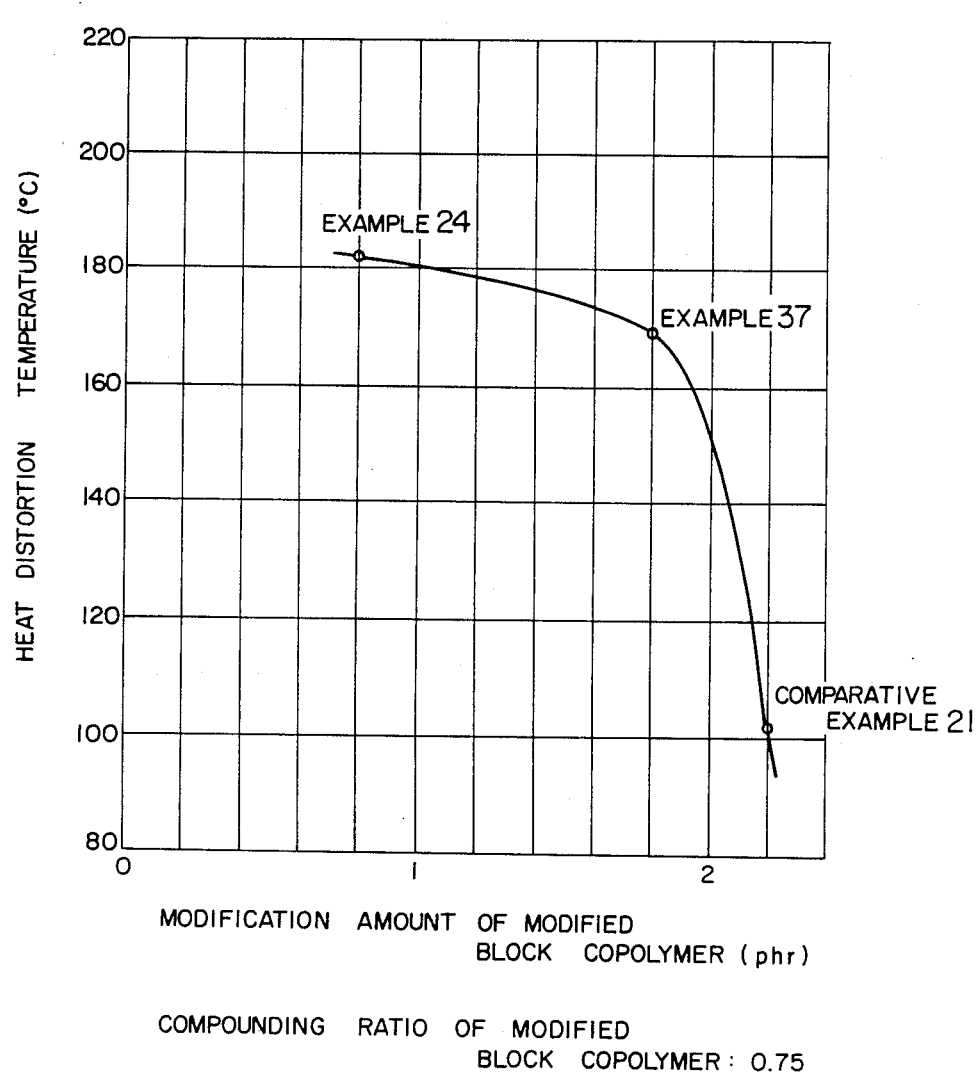
FIG. 12 is a graph showing the relationship between the modification amount of modified block copolymer and heat distortion termperature for an ethylene-containing polymer-type composition wherein the compounding radio of modified block copolymer is 0.75.

Comparison with Examples 24 and 37 reveals that, as shown in FIG. 12, the heat distortion temperature decreases steeply when the modification amount of modified block copolymer exceeds 2 phr.

COMPARATIVE EXAMPLE 22

A mixture of 75 parts by weight of the polyamide used in Example 39 and 25 parts by weight of the modified block polymer used in Example 39 is kneaded in the same manner as in Comparative Example 13, and the physical properties of the resulting composition are determined. It showed a low weld zone strength of 14 kg·cm/cm and poor gloss of 48%.

Figure 13:
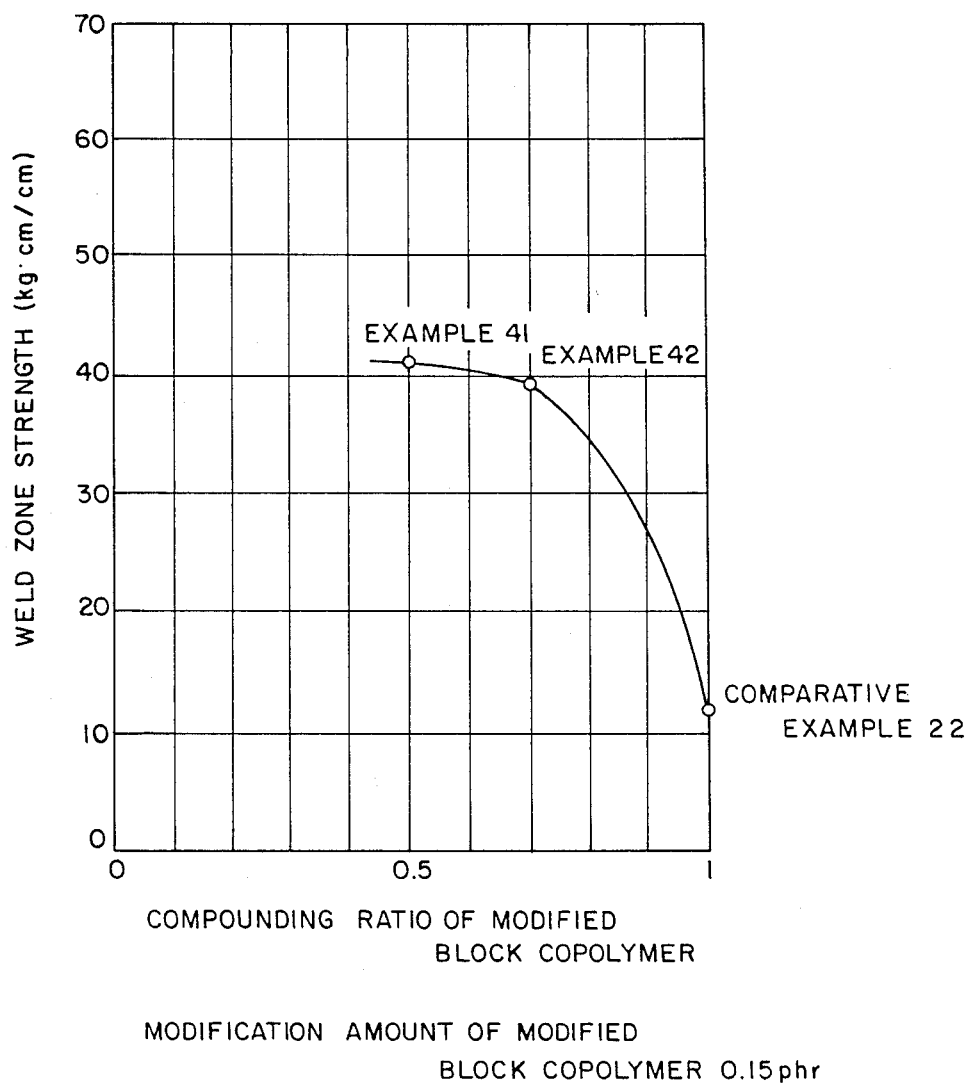
FIG. 13 is a graph showing the relationship between the modification amount of modified block copolymer and weld zone strength for an ethylene-containing polymer-type composition wherein the compounding ratio of modified block copolymer is 0.25 phr.

Comparison with Examples 41 and 42 reveals that, as shown in FIG. 13, the weld zone strength decreases steeply when the compounding ratio of the modified block copolymer exceeds 0.9.

EXAMPLE 44

(1) Preparation of modified block copolymer

Kraton ® G 1652 (a trade mark, mfd. by Shell Chemical Co., Styrene content: 36%) is used as hydrogenated block copolymer. To 100 parts by weight of the hydrogenated block copolymer are uniformly mixed 2.5 parts by weight of maleic anhydride and 0.2 part by weight of Perhexa ® 2,5B (a trade name, mfd. by Nippon Oil & Fats Co., Ltd.), and the mixture is processed in the same manner as in Reference Example 2 to obtain a modified block copolymer. The addition amount of maleic anhydride is 0.8 phr.

(2) Preparation of composition

A mixture of 75 parts by weight of Kraton ® G 1652 as hydrogenated block copolymer and 25 parts by weight of the modified block copolymer obtained in (1) above is dry-blended. Thereafter, the resulting mixture is melt-kneaded in a twin screw extruder at a cylinder temperature of 260° C. and extruded therefrom to obtain an elastomer composition in the form of pellets. Then, 22 parts by weight of the elastomer composition obtained in the form of pellets and 78 parts by weight of nylon 66 (number average molecular weight: 18,000) is dry-blended and thereafter the resulting mixture is melt-kneaded in a twin screw extruder at a cylinder temperature of 290° C. and extruded the mixture in the form of pellets and the physical properties of the test pieces cut out from the molded composition by injecting said pellets. It showed excellent properties of an Izod impact strength of 188 kg·cm/cm, weld zone strength of 42 kg·cm/cm, flexural modulus of 19,200 kg/cm$^2$, bending strength of 702 kg/cm$^2$, and heat distortion temperature of 197° C., and also showed good appearance of molded articles, the gloss being 70% and excellent moldability.

EXAMPLE 45

A mixture of 40 parts by weight of the modified block copolymer used in Example 44 and 60 parts by weight of the ethylene-propylene copolymer used in Example 21 is melt-kneaded in the same manner as in Example 44 to obtain an elastomer composition. A mixture of 22 parts by weight of the elastomer composition obtained above and 78 parts by weight of the polyamide used in Example 44 is melt-kneaded in the same manner as in Example 44, and the physical properties of the resulting composition are determined. It showed excellent properties of an Izod impact strength of 83 kg·cm/cm, weld zone strength of 49 kg·cm/cm, flexural modulus of 18,000 kg/cm$^2$, bending strength of 670 kg/cm$^2$ and heat distortion temperature of 185° C., and also showed good appearance of molded articles and moldability.

EXAMPLE 46

(1) Preparation of modified block copolymer

Kraton ® G (a trade name, mfd. by Shell Chemical Co., styrene content: 14%) is used as hydrogenated block copolymer. To 100 parts by weight of the hydrogenated block copolymer are uniformly mixed 1.5 parts by weight of maleic anhydride and 0.5 part by weight of Perbutyl ® D (a trade name, mfd. by Nippon Oil & Fats Co., Ltd), and the mixture is processed in the same manner as in Reference Example 2 to obtain a modified block copolymer. The addition amount of maleic anhydride is 0.6 phr.

(2) Preparation of composition

A mixture of 50 parts by weight of Kraton ® G 1657 as hydrogenated block copolymer and 50 parts by weight of the modified block copolymer obtained in (1) above is melt-kneaded in the same manner as in Example 44 to obtain an elastomer composition. Then, a mixture of 22 parts by weight of the elastomer composition obtained above and 78 parts by weight of the polyamide used in Example 44 is melt-kneaded in the same manner as in Example 44, and the physical properties of the resulting composition are determined. It showed excellent properties of an Izod impact strength of 116 kg·cm/cm, weld zone strength of 30 kg·cm/cm, flexural modulus of 18,000 kg/cm$^2$, bending strength of 610 kg/cm$^2$, and heat distortion temperature of 177° C., and also showed good appearance of molded articles and moldability.

Further, the state of dispersion is examined by use of a transmission electron microscope (OsO$_4$-stained very thin slice technique; measured at Toray Research Center K.K.). The size of dispersed particles is found to be about 0.1 to 2 $\mu$m or slightly more.

EXAMPLE 47

The mixture of 50 parts by weight of the modified block copolymer obtained in (1) of Examples 46 and 50 parts by weight of the ethylene-propylene polymer used in Example 21 is melt-kneaded in the same manner as in Example 44 to obtain an elastomer composition. Then, 22 parts by weight of the elastomer composition obtained above and 78 parts by weight of the polyamide used in Example 44 is melt-kneaded in the same manner as in Example 44, and the physical properties of the resulting composition are determined. It showed excellent properties of an Izod impact strength of 101 kg·cm/cm, weld zone strength of 32 kg·cm/cm, flexural modulus of 18,000 kg/cm$^2$ and bending strength of 640 kg/cm$^2$ and also showed good appearance of molded articles and moldability.

What is claimed is:

1. A polyamide composition which comprises (a) 60 to 90% by weight of polyamide, (b) 2 to 36% by weight of at least one polymer selected from the group consisting of (i) a hydrogenated block copolymer comprising a vinyl aromatic polymer block A and an olefin polymer block B, the degree of unsaturation of said block B not exceeding 20%, and (ii) an ethylene-containing polymer, and (c) 2 to 36% by weight of a modified block copolymer formed by bonding a molecular unit containing a carboxylic acid group or its derivative group to a hydrogenated block copolymer, which is the same as defined above, the amount of said molecular unit containing a carboxylic acid group or its derivative group bonded to the modified block copolymer of (c), expressed in terms of x parts by weight per 100 parts by weight of the hydrogenated block copolymer before modification, and the compounding ratio of said modified block copolymer of (c) to the sum of the weight of the modified block copolymer of (c) and the weight of the at least one polymer of (b), expressed in terms of y, being within the range specified by the expression $0.1 \leq x \leq 2$, $0.1 \leq y \leq 0.9$, and $y \geq -x + 0.5$.

2. The polyamide composition according to claim 1 wherein the amount of said polyamide is 65 to 85% by weight.

3. The polyamide composition according to claim 1 wherein said polyamide is nylon 6 or nylon 66.

4. The polyamide composition according to claim 1, wherein (b) is 3 to 30% by weight.

5. The polyamide composition according to claim 1 wherein the ethylene-containing polymer (b) is an ethylene-α-olefin copolymer.

6. The polyamide composition according to claim 1 wherein (c) is 3 to 30% by weight.

7. The polyamide composition according to claim 1 wherein the carboxylic acid group or its derivative group of (c) is derived from maleic anhydride.

8. The polyamide composition according to claim 1 wherein the modification amount of said modified block copolymer is 0.15 to 1.8 parts by weight per 100 parts by weight of the hydrogenated block copolymer before modification.

9. The polyamide composition according to claim 1 wherein the compounding ratio y of said modified block copolymer is 0.15 to 0.85.

10. The polyamide composition according to claim 1 wherein the relation between the compounding ratio y of said modified block polymer and the modifiction amount x of the same polymer is expressed by the expression $y \geq x + 0.6$.

* * * * *

UNITED STATES PATENT AND TRADEMARK OFFICE
CERTIFICATE OF CORRECTION

PATENT NO. : 4,849,471
DATED : July 18, 1989
INVENTOR(S) : K. Saito et al

Figure 14:
FIG. 14 is a transmission electron microphotograph showing the state of dispersion of a test piece injection-molded from the composition of Example 46.

It is certified that error appears in the above-indentified patent and that said Letters Patent is hereby corrected as shown below:

Add the Drawing Sheets, consisting of Figures 13 and 14, as shown on the attached pages.

Signed and Sealed this

First Day of April, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 4,849,471

DATED : July 18, 1989

INVENTOR(S) : K. SAITO et al

It is certified that error appears in the above-identified patent and that said Letters Patent is hereby corrected as shown below:

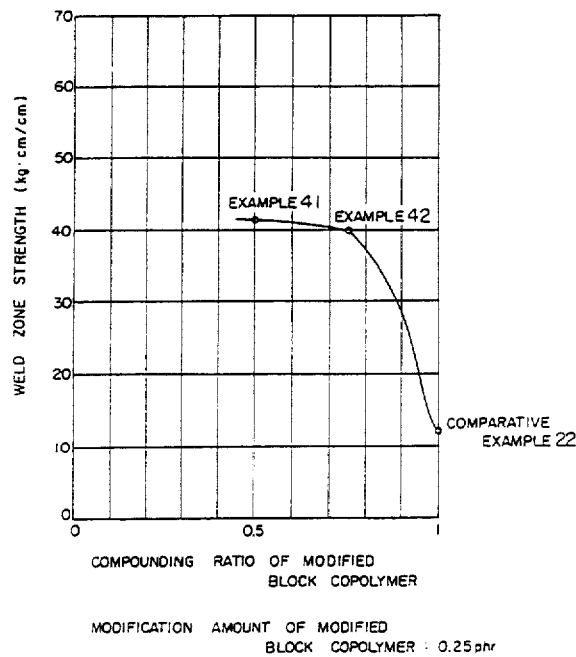

FIG. 13

UNITED STATES PATENT AND TRADEMARK OFFICE
CERTIFICATE OF CORRECTION

PATENT NO. : 4,849,471

DATED : July 18, 1989

INVENTOR(S) : K. Saito et al

It is certified that error appears in the above-identified patent and that said Letters Patent is hereby corrected as shown below:

FIG. 14

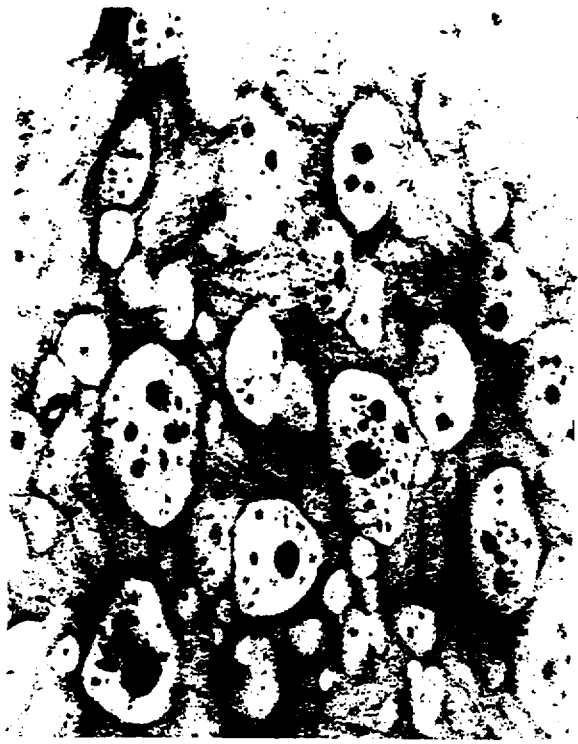

X 40000